United States Patent
Cho

(10) Patent No.: US 9,562,723 B2
(45) Date of Patent: Feb. 7, 2017

(54) WHITE SMOKE REDUCING SYSTEM AND METHOD OF RECOVERING WASTE HEAT AND WATER USING THE SAME

(71) Applicants: Kil Hwan Cho, Gumi-si (KR); Han Ule Cho, Seoul (KR)

(72) Inventor: Han Ule Cho, Seoul (KR)

(73) Assignees: Han Ule Cho, Seoul (KR); Kil Hwan Cho, Gumi-Si (KR)

( * ) Notice: Subject to any disclaimer, the term of this patent is extended or adjusted under 35 U.S.C. 154(b) by 697 days.

(21) Appl. No.: 13/933,725

(22) Filed: Jul. 2, 2013

(65) Prior Publication Data

US 2014/0174697 A1 Jun. 26, 2014

(30) Foreign Application Priority Data

Dec. 26, 2012 (KR) ............ 10-2012-0152700
Dec. 26, 2012 (KR) ............ 10-2012-0152705
Dec. 26, 2012 (KR) ............ 10-2012-0152708
Dec. 26, 2012 (KR) ............ 10-2012-0152711

(51) Int. Cl.
| | | |
|---|---|---|
| F28D 7/00 | (2006.01) | |
| F28F 9/02 | (2006.01) | |
| F28D 9/00 | (2006.01) | |
| F28D 21/00 | (2006.01) | |
| F28B 1/06 | (2006.01) | |
| F24H 8/00 | (2006.01) | |

(52) U.S. Cl.
CPC ............ *F28D 7/0083* (2013.01); *F28B 1/06* (2013.01); *F28D 9/0093* (2013.01); *F28D 21/0003* (2013.01); *F28F 9/0209* (2013.01); *F23J 2219/70* (2013.01); *F24D 2200/18* (2013.01); *F24H 8/006* (2013.01); *F28B 2001/065* (2013.01); *Y02B 30/106* (2013.01)

(58) Field of Classification Search
CPC ........ F28D 7/0075; F28D 7/0083; F28B 1/02; F28B 1/06; F28B 2001/065; F28B 9/08; F28F 27/003; F23J 2219/70; F23J 2900/13004; F23J 15/06
See application file for complete search history.

(56) References Cited

U.S. PATENT DOCUMENTS

| | | | | |
|---|---|---|---|---|
| 1,814,011 A | * | 7/1931 | Snow | F28D 7/0066 126/109 |
| 1,914,604 A | * | 6/1933 | Keenan, Jr. | F28D 9/0037 122/DIG. 1 |
| 2,511,647 A | * | 6/1950 | Marshall | F23L 15/04 110/304 |
| 2,951,685 A | * | 9/1960 | Bliss | F22B 1/16 165/110 |
| 2,970,811 A | * | 2/1961 | Ruch | F28D 7/0066 165/104.21 |
| 4,305,455 A | * | 12/1981 | Lipets | F28F 19/00 165/134.1 |

(Continued)

*Primary Examiner* — Devon Russell
(74) *Attorney, Agent, or Firm* — Hauptman Ham, LLP

(57) ABSTRACT

Disclosed therein are a white smoke reducing system and a method of recovering waste heat and water using the white smoke reducing system. The white smoke reducing system includes a discharge gas inflow pipe, a water recovery part, a sensible heat exchanger, a first latent heat exchanger, a second latent heat exchanger, a steam separator, a discharge part, a circulation duct, and a mixing duct.

3 Claims, 25 Drawing Sheets

(56) References Cited

U.S. PATENT DOCUMENTS

| | | | | |
|---|---|---|---|---|
| 4,416,325 A * | 11/1983 | Barratt | F23L 15/04 110/254 |
| 4,483,391 A * | 11/1984 | Gilbert | F23L 15/04 165/108 |
| 4,576,226 A * | 3/1986 | Lipets | F23L 15/04 165/134.1 |
| 4,949,782 A * | 8/1990 | Braud | F23L 15/04 165/134.1 |
| 5,391,220 A * | 2/1995 | Patterson | B01D 45/08 55/462 |
| 5,787,821 A * | 8/1998 | Bhat | F23J 15/006 110/215 |
| 5,843,214 A * | 12/1998 | Janes | B01D 47/06 55/315.2 |
| 6,571,548 B1 * | 6/2003 | Bronicki | F01K 23/10 60/39.181 |
| 6,957,695 B2 * | 10/2005 | Lomax, Jr. | F28D 7/1653 165/140 |
| 7,849,692 B2 * | 12/2010 | Baldwin | F01K 25/10 60/653 |
| 8,006,651 B2 * | 8/2011 | Veitch | F23J 15/06 122/31.1 |
| 8,181,463 B2 * | 5/2012 | Batscha | F01K 25/08 60/651 |
| 2002/0005276 A1 * | 1/2002 | Youssef | F28B 1/02 165/110 |
| 2003/0075309 A1 * | 4/2003 | Langl | F28D 7/0066 165/159 |
| 2005/0194120 A1 * | 9/2005 | Lomax, Jr. | F28D 7/0075 165/100 |
| 2010/0065253 A1 * | 3/2010 | Fujita | F28B 1/02 165/104.21 |
| 2015/0267637 A1 * | 9/2015 | Kuroyanagi | F28F 9/02 165/52 |

* cited by examiner

WHITE SMOKE REDUCING SYSTEM AND METHOD OF RECOVERING WASTE HEAT AND WATER USING THE SAME

CROSS REFERENCE TO RELATED APPLICATION

This application claims the priority of Korean Patent Application No. 10-2012-0152700, No. 10-2012-0152705, No. 10-2012-0152708, and No. 10-2012-0152711, filed on Dec. 26, 2012, in the KIPO (Korean Intellectual Property Office), which is incorporated herein by reference in its entirety.

BACKGROUND OF THE INVENTION

Field of the Invention

The present invention relates to a white smoke reducing system and a method of recovering waste heat and water using the same, and more particularly, to a white smoke reducing system and a method of recovering waste heat and water using the white smoke reducing system, which can recover and reuse waste heat by heat-exchanging heat of high temperature contained in exhaust gas of high temperature and humidity without discharging the exhaust gas of high temperature and humidity to the air through a chimney or the like as it is in order to save energy required for operating industrial facilities, such as boilers, incinerators, driers, and so on, which can recover moisture contained in the exhaust gas of high temperature and humidity and reuse as available water using moisture condensation in the exhaust gas through heat-exchange of the exhaust gas in order to save an use amount of available water used when the industrial facilities, such as boilers, incinerators, driers, and so on, and which can remove heat and moisture contained in the exhaust gas of high temperature and humidity in order to remove white smoke of exhaust gas generated when the exhaust gas of high temperature and humidity is discharged to the air as it is.

Background Art

In general, in still mills and places where industrial facilities, such as boilers, incinerators, and driers, vapor is generated while the facilities are used. In detail, in the still mills, vapor is generated because water is used during the process of cooling materials, in the boilers and incinerators, vapor is generated while a direct cooling device is used in order to remove dust of exhaust air after high temperature combustion, and in the driers, vapor is generated while drying products.

In the meantime, the generated vapor is discharged to the outside through a chimney to prevent damages of the industrial facilities and not to disturb work of workers, and the exhaust gas discharged to the outside through the chimney causes a white smoke phenomenon when it is discharged through the chimney because it contains a great deal of moisture and solutes.

In this instance, the white smoke arises because heated humid air is mixed with cold air in the atmosphere and cooled below the dew point. That is, the white smoke arises when the heated humid air is cooled under the upper side of the 100% saturation curve of the psychometric chart, and gets more severe in the winter season that air temperature in the atmosphere is low.

Moreover, the white smoke is viewed as a visible pollution even though it is not a pollutant when solutes are not used, may give an unpleasant feeling to a person who is exposed to water drops because water drops, which are formed while exhaust gas of high temperature and humidity discharged in the form of white smoke through the chimney is cooled below the dew point due to cold air in the atmosphere, fall around the chimney. Furthermore, in the winter season, the water drops falling on the road form an icy road, and hence, passengers may slip on the icy road and hurt themselves.

Meanwhile, in order to solve the above problems, Korean Patent No. 10-1197283 discloses an apparatus for preventing white plume, which includes: a refrigerant compressor for compressing refrigerant at high temperature and pressure; a heating part for emitting heat to the outside while the refrigerant discharged from the refrigerant compressor circulates inside the heating part so as to form a liquid of room temperature and high pressure; a refrigerant pipe to which the refrigerant discharged from the heating part is introduced, the refrigerant pipe having an expansion pipe; and a cooling part mounted below the heating part for cooling the outside discharged air while the refrigerant of low temperature and pressure liquefied after passing through the refrigerant pipe circulates inside the cooling part and is evaporated so as to condense vapor in the discharged air.

However, the above-mentioned prior art can just prevent white smoke but cannot recover waste heat or a great quantity of moisture contained in exhaust gas so as to reuse.

Additionally, the prior art has several problems in that it requires heavy costs in manufacturing the apparatus and requires additional costs in operating the apparatus because it is complicated in structure, and in that it requires frequent maintenance.

Therefore, in order to solve the above problems of the prior art, an improved white smoke reducing system and a method of recovering waste heat and water using the same is required.

CITED REFERENCE

Korean Patent No. 10-1197283

SUMMARY OF THE INVENTION

Accordingly, the present invention has been made to solve the above-mentioned problems occurring in the prior arts, and it is an object of the present invention to provide a white smoke reducing system and a method of recovering waste heat and water using the same, which can recover waste heat contained in exhaust gas so as to reuse an energy as a heat source for heating without discharging the exhaust gas of high temperature and humidity discharged from industrial facilities to the air through a chimney or the like as it is, thereby reducing a waste of energy.

It is another object of the present invention to provide a white smoke reducing system and a method of recovering waste heat and water using the same, which can condense a great quantity of moisture contained in the exhaust gas of high temperature and humidity through heat exchange and recover a moisture-condensed water so as to reuse, thereby reducing consumption of water and solute used as cooling water.

Moreover, it is a further object of the present invention to provide a white smoke reducing system and a method of recovering waste heat and water using the same, which can prevent white smoke generated when the exhaust gas of high temperature and humidity is discharged out by condensing a great quantity of moisture contained in the exhaust gas through heat exchange and recovering the condensed solute to reuse, in relation with white smoke mainly generated in the winter season when the exhaust gas of high temperature and humidity is discharged through a chimney.

To achieve the above objects, the present invention provides a white smoke reducing system including: a discharge gas inflow pipe for supplying exhaust gas containing vapor; a water recovery part which includes: a discharge gas inlet connected with the discharge gas inflow pipe and formed at one side thereof to receive discharge gas; an upper plate of a flat type disposed at an upper portion thereof and having a water recovery hole perforated therein; and a cylindrical water recovery pipe disposed at one side of a lower portion; a sensible heat exchanger which is disposed on the water recovery part and includes: a lower plate of a flat type joined to the upper plate of the water recovery part and having an inner space corresponding to the upper plate; a corrugated heat exchanging unit disposed on the lower plate and having a plurality of corrugated sheets mounted at right angles to the lower plate, the corrugated sheets being arranged in such manner that corrugations are symmetric with corrugations of other corrugated sheets so that exhaust conduits for moving the exhaust gas are formed between the corrugated sheets; heat exchanging unit covers of a flat type respectively disposed at upper and lower portion of the corrugated heat exchanging unit and having through holes formed corresponding to the exhaust conduits for moving the exhaust gas; side plates disposed at both sides of the outer periphery of the corrugated heat exchanging unit and respectively having the air inlet and the air outlet; and an upper plate mounted on upper portions of the side plates and having an inner space corresponding to the lower plate; a first latent heat exchanger which is disposed on the sensible heat exchanger and includes: a first lower plate having an inner space corresponding to the upper plate of the sensible heat exchanger; a first corrugated heat exchanging unit disposed on the first lower plate and having a plurality of corrugated sheets mounted at right angles to the first lower plate, the corrugated sheets being arranged in such manner that corrugations are symmetric with corrugations of other corrugated sheets so that first exhaust conduits for moving the exhaust gas are formed between the corrugated sheets; first heat exchanging unit covers of a flat type respectively disposed at upper and lower portion of the first corrugated heat exchanging unit and having through holes formed corresponding to the first exhaust conduits for moving the exhaust gas; first side plates disposed at the outer periphery of the first corrugated heat exchanging unit and being at right angles to the first lower plate; a first upper plate mounted on upper portions of the first side plates and having an inner space corresponding to the first lower plates, wherein the first lower plate, the first corrugated heat exchanging units, the first heat exchanging unit covers, the first side plates and the first upper plates are laminated in multi stage; a water discharge hole disposed at one side of a lower portion for discharging water; and water circulation holes symmetrically formed in the upper portion of one side and in the lower portion of the other side in a zigzag form so that water passes from the top to the bottom inside the first latent heat exchanger whose components are laminated in multi stage; a second sensible heat exchanger which is disposed on the first latent heat exchanger and includes: a second lower plate joined to the upper portion of the first upper plate of the first latent heat exchanger and having an inner space corresponding to the first upper plate of the first latent heat exchanger; a second corrugated heat exchanging unit disposed on the second lower plate and having a plurality of corrugated sheets mounted at right angles to the second lower plate, the corrugated sheets being arranged in such manner that corrugations are symmetric with corrugations of other corrugated sheets so that second exhaust conduits for moving the exhaust gas are formed between the corrugated sheets; second heat exchanging unit covers of a flat type respectively disposed at upper and lower portion of the second corrugated heat exchanging unit and having through holes formed corresponding to the second exhaust conduits for moving the exhaust gas; second side plates respectively disposed at the outer periphery of the second corrugated heat exchanging unit and having an outside air outlet perforated in one side and an outside air inlet perforated in the other side for introducing the outside air; an upper dispersion plate of a flat type disposed at the outside air inlet for dispersing and supplying exhaust gas through a plurality of through holes thereof; and a second upper plate disposed on the second side plates and having an inner space formed corresponding to the second lower plate; a steam separator which is disposed on the second sensible heat exchanger and includes: a lower plate joined to the upper portion of the second upper plate and having an inner space formed corresponding to the second upper plate; a plurality of steam separating members of a flat type respectively spaced apart from one another on the lower plate and arranged in a zigzag form in the upward direction; blocking members respectively disposed at the front ends of upper portions of the steam separating members and respectively being bent downwardly; side plates disposed on the outer circumferential surfaces of the steam separating members and the blocking members; and an upper plate disposed on the side plates and having an inner space formed corresponding to the lower plate; a discharge part which is disposed on the steam separator and includes: a lower plate joined to the upper portion of the upper plate of the steam separator and having an inner space formed corresponding to the upper plate of the steam separator; side plates disposed on the lower plate, the side plates being assembled in such a manner that upper and lower portions are opened and the outer periphery is gradually narrowed in the upward direction; an inlet formed in one side of the side plate; and a dispersion plate of a flat type formed inside the inlet and having a plurality of through holes formed therein; a circulation duct connected with the air inlet of the sensible heat exchanger and the outside air outlet of the second sensible heat exchanger for supplying the outside air of the second sensible heat exchanger to the sensible heat exchanger; and a mixing duct connected to the air outlet of the sensible heat exchanger and the inlet of the discharge part for supplying the outside air discharged through the air outlet 26 to the discharge part through the inlet.

In another aspect, the present invention provides a method of recovering waste heat and water using a white smoke reducing system, which includes a discharge gas inflow pipe, a water recovery part, a sensible heat exchanger, a first latent heat exchanger, a second sensible heat exchanger, a steam separator, a discharge part, a circulation duct for connecting the above components, and a mixing duct, comprising: a first step of supplying exhaust gas of high temperature and humidity of 70° C. to 80° C. generated from industrial facilities to the water recovery part through the discharge gas inflow pipe; a second step of supplying the exhaust gas of 70° C. to 80° C. of the water recovery part to an exhaust conduit of a corrugated heat exchanging unit of the sensible heat exchanger through a water recovery hole formed in an upper plate of the water recovery part, making temperature of the exhaust gas inside the exhaust conduit reach 60° C. to 70° C. by heat-exchanging with the outside air of 15° C. to 25° C. supplied to the outside of the exhaust conduit through the circulation duct and an air inlet of the sensible heat exchanger, and making the outside air passing outside the exhaust conduit reach 35° C. to 45° C. by heat-exchanging with the exhaust gas inside the exhaust conduit and discharging the outside air through an air outlet of the sensible heat exchanger; a third step of supplying the exhaust gas, which reaches 60° C. to 70° C. while passing the exhaust conduit of the sensible heat exchanger, to a first exhaust conduit of a first corrugated heat exchanging unit of the first latent heat exchanger laminated in multi stage on the exhaust conduit, supplying water at one side of the upper portion laminated in multi stage inside the first latent heat exchanger through a water inlet, passing the supplied water from the top to the bottom along water circulation holes symmetrically formed at an upper portion of one side and a lower portion of the other side in a zigzag form in all layers laminated inside the first latent heat exchanger in multi stage, and making the exhaust gas of the first exhaust conduit reach 40° C. to 50° C. by heat-exchanging with water, which is supplied to the outside of the first exhaust conduit and discharged through a water discharge hole disposed at one side of a lower portion of the first latent heat exchanger; a fourth step of supplying the exhaust gas, which reaches 40° C. to 50° C. while passing the first exhaust conduit of the first latent heat exchanger, to a second exhaust conduits of a second corrugated heat exchanging unit formed inside the second sensible heat exchanger disposed on the first exhaust conduit, making the exhaust gas of the second exhaust conduit reach 30° C. to 40° C. by heat-exchanging with the outside air of 0° C. to 10° C., which is introduced to the outside of a second exhaust conduit through an outside air inlet formed at the other side of the second sensible heat exchanger, and supplying the outside air heat-exchanged with the exhaust gas, whose temperature rises to 15° C. to 25° C., to the circulation duct through an outside air outlet formed at one side of the second sensible heat exchanger; a fifth step of supplying the exhaust gas, which reaches 30° C. to 40° C. while passing through the second exhaust conduit of the second sensible heat exchanger, to blocking members bent downwardly at the front ends of the upper portions of a plurality of steam separating members of a flat type formed inside the steam separator 50 disposed on the second exhaust conduit and arranged in the zigzag form in the upward direction, and separating moisture from the exhaust gas supplied to the steam separating members and the blocking members and discharging the exhaust gas; and a sixth step of supplying the exhaust gas from which moisture is separated to the discharge part disposed on the steam separator, and mixing the exhaust gas of 30° C. to 40° C. supplied to the discharge part with the outside air of 35° C. to 45° C. and discharging the mixed exhaust gas to the outside through the mixing duct connected with an inlet formed at one side of the discharge part and the air outlet of the sensible heat exchanger.

The white smoke reducing system and the method of recovering waste heat and water using the same according to the present invention can recover waste heat contained in exhaust gas so as to reuse an energy as a heat source for heating without discharging the exhaust gas of high temperature and humidity discharged from industrial facilities to the air through a chimney or the like as it is, thereby reducing a waste of energy. Additionally, the present invention can condense a great quantity of moisture contained in the exhaust gas of high temperature and humidity through heat exchange and recover a moisture-condensed water so as to reuse, thereby reducing consumption of water and solute used as cooling water. In addition, in relation with white smoke mainly generated in the winter season when the exhaust gas of high temperature and humidity is discharged through a chimney, the present invention can prevent generation of white smoke by condensing a great quantity of moisture contained in the exhaust gas through heat exchange and recovering the condensed water to reuse.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
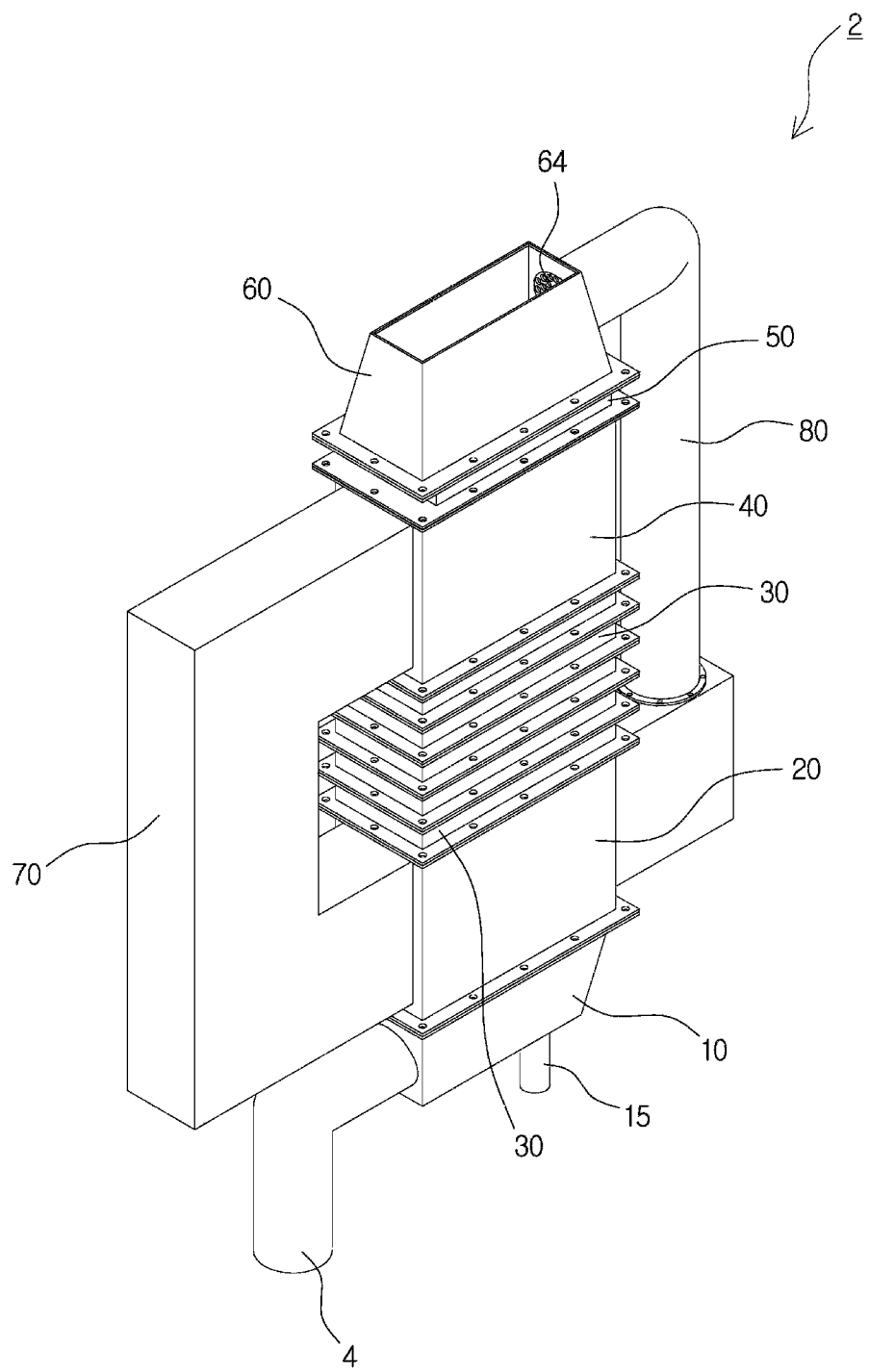
FIG. 1 is a perspective view of a white smoke reducing system according to the present invention.
Figure 2:
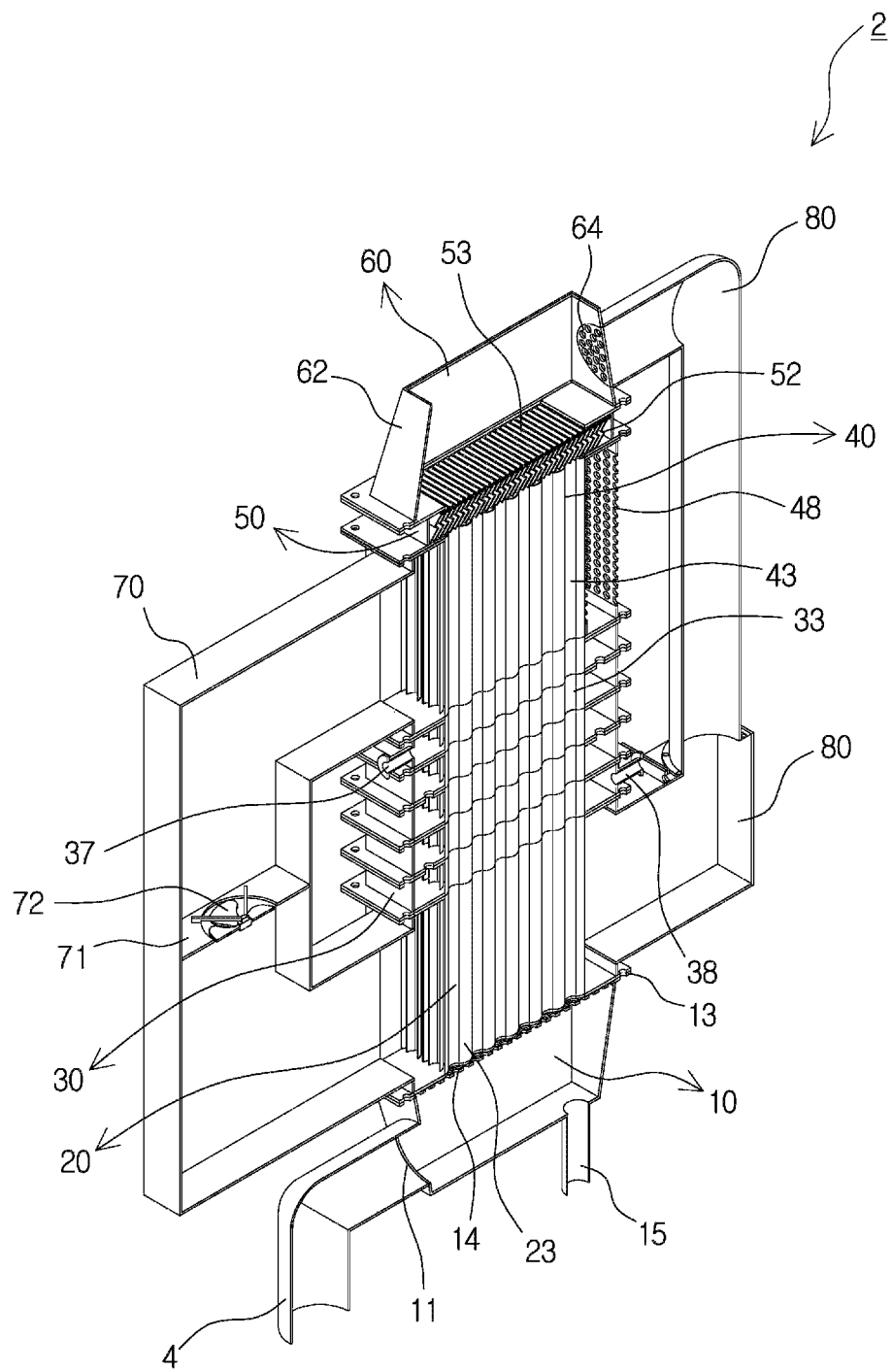
FIG. 2 is a perspective view of the white smoke reducing system according to the present invention, in cross section.
Figure 3:
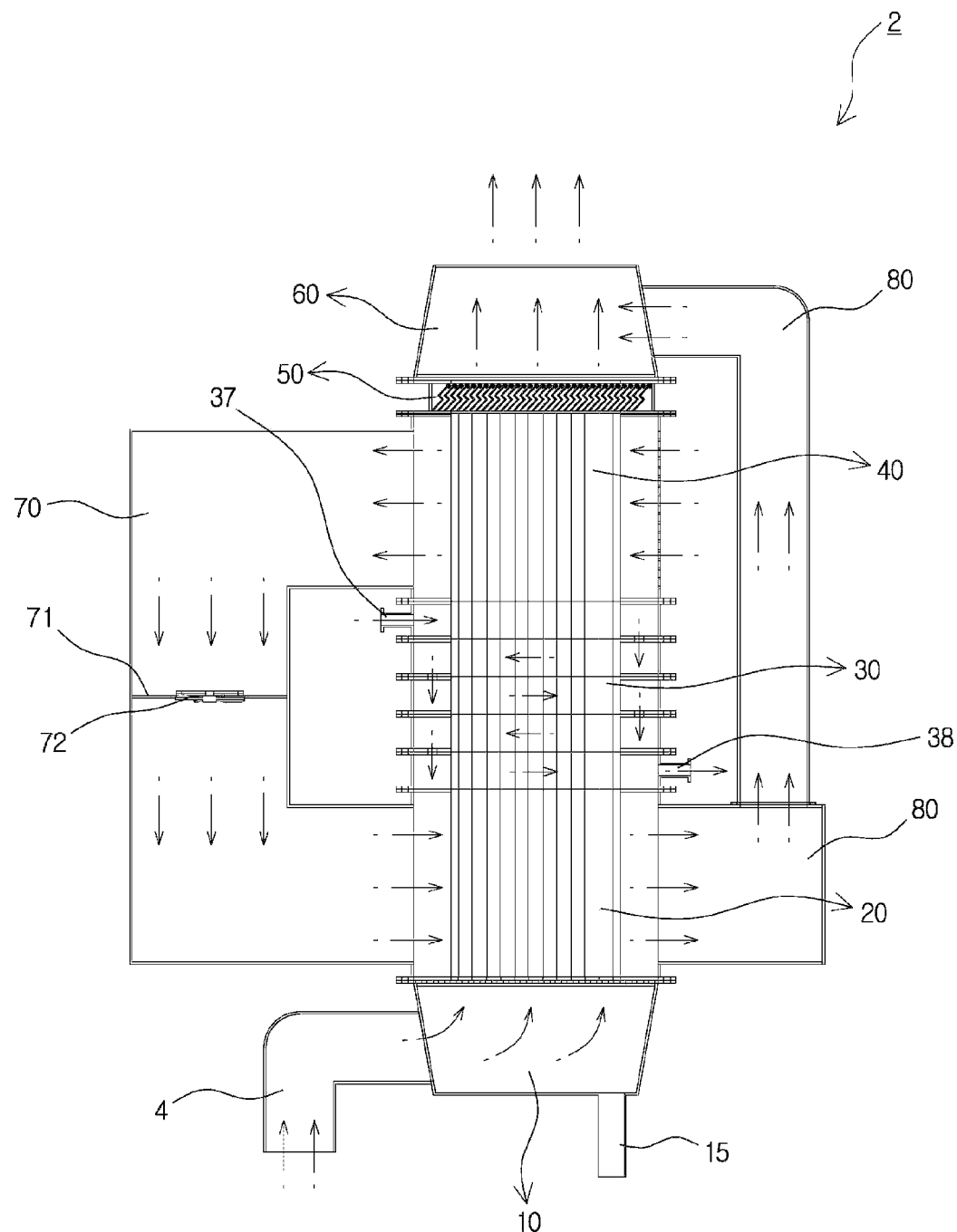
FIG. 3 is a front sectional view showing a flow of gas and fluid of the white smoke reducing system.
Figure 4:
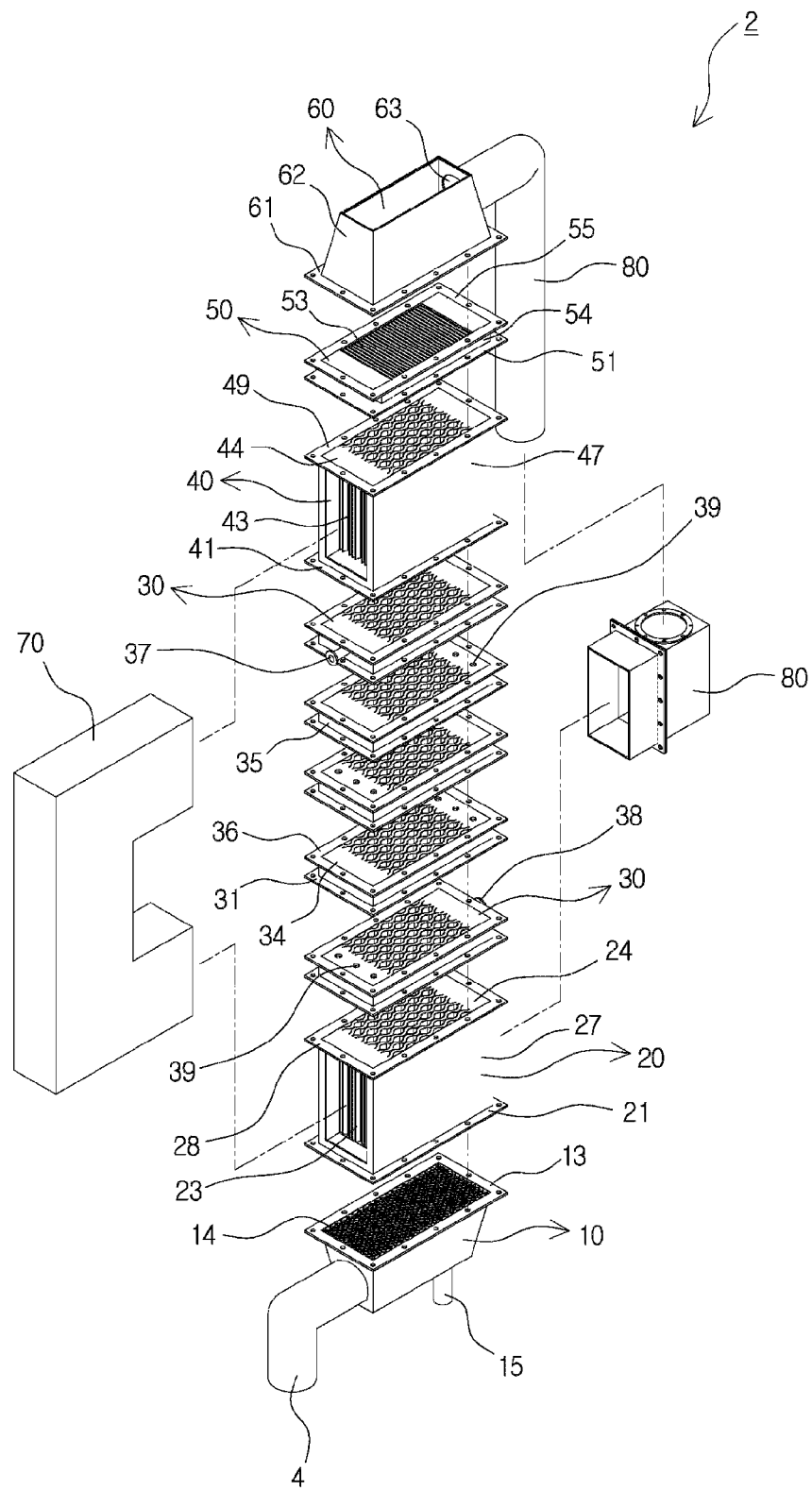
FIG. 4 is an exploded perspective view of the white smoke reducing system.
Figure 5:
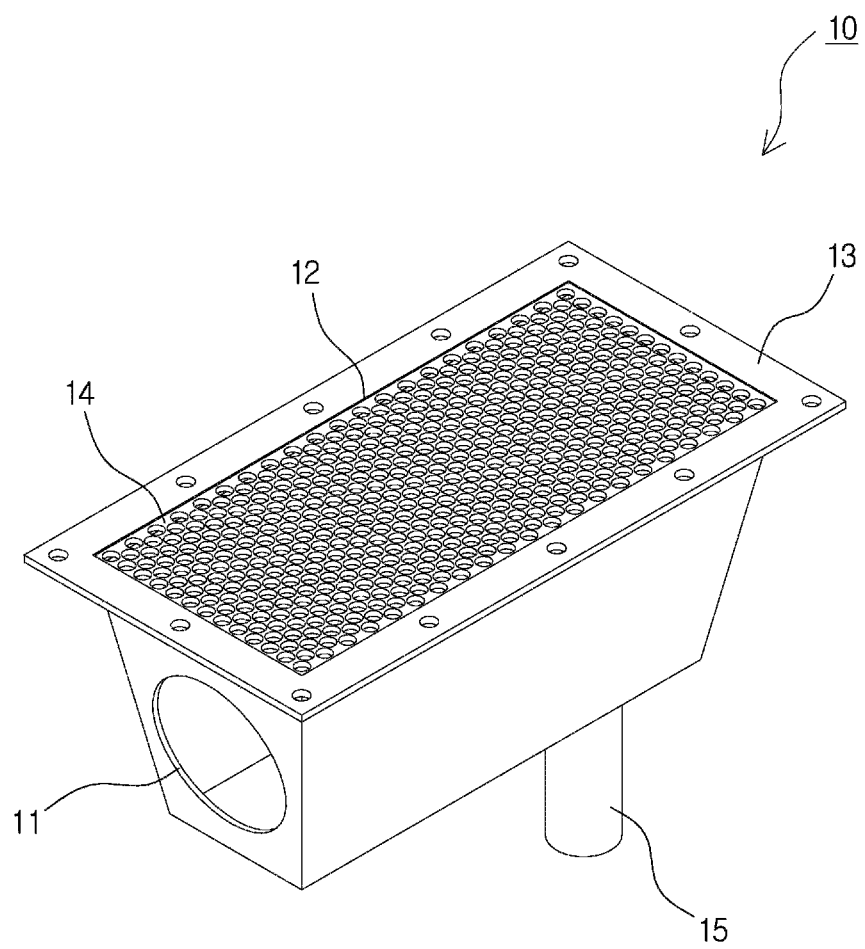
FIG. 5 is a perspective view of a water recovery part according to the present invention.
Figure 6:
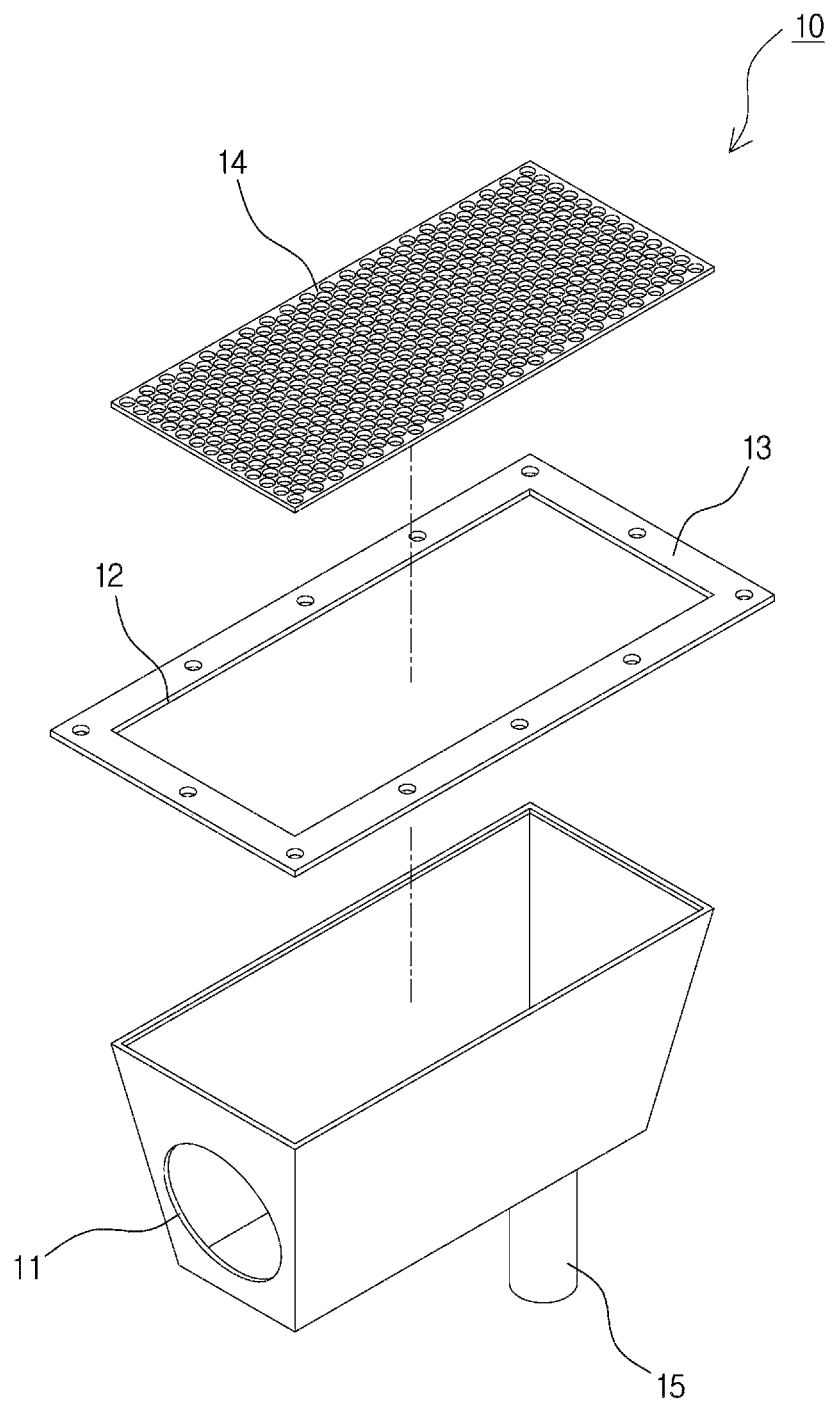
FIG. 6 is an exploded perspective view of the water recovery part.
Figure 7:
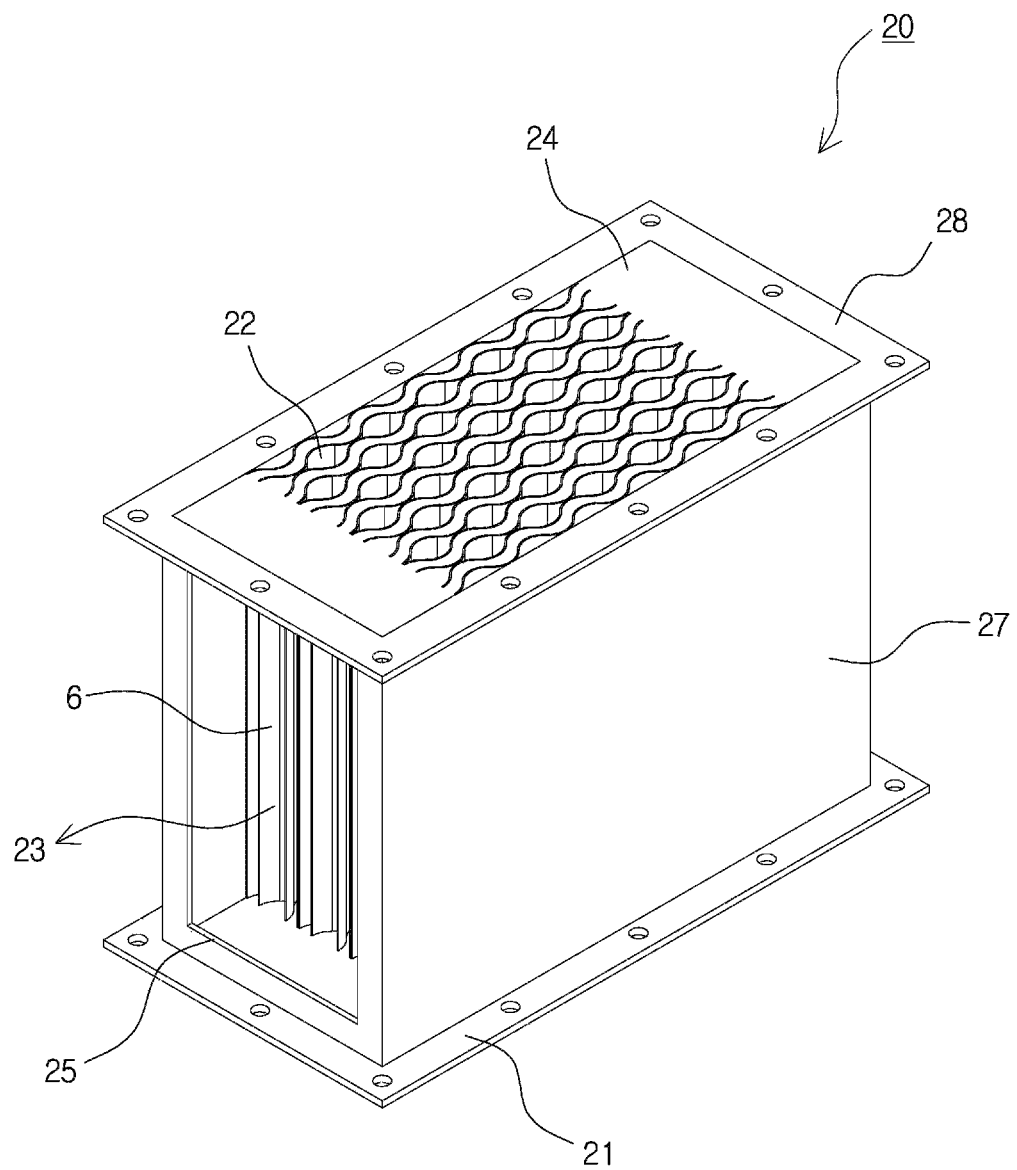
FIG. 7 is a perspective view of a sensible heat exchanger according to the present invention.
Figure 8:
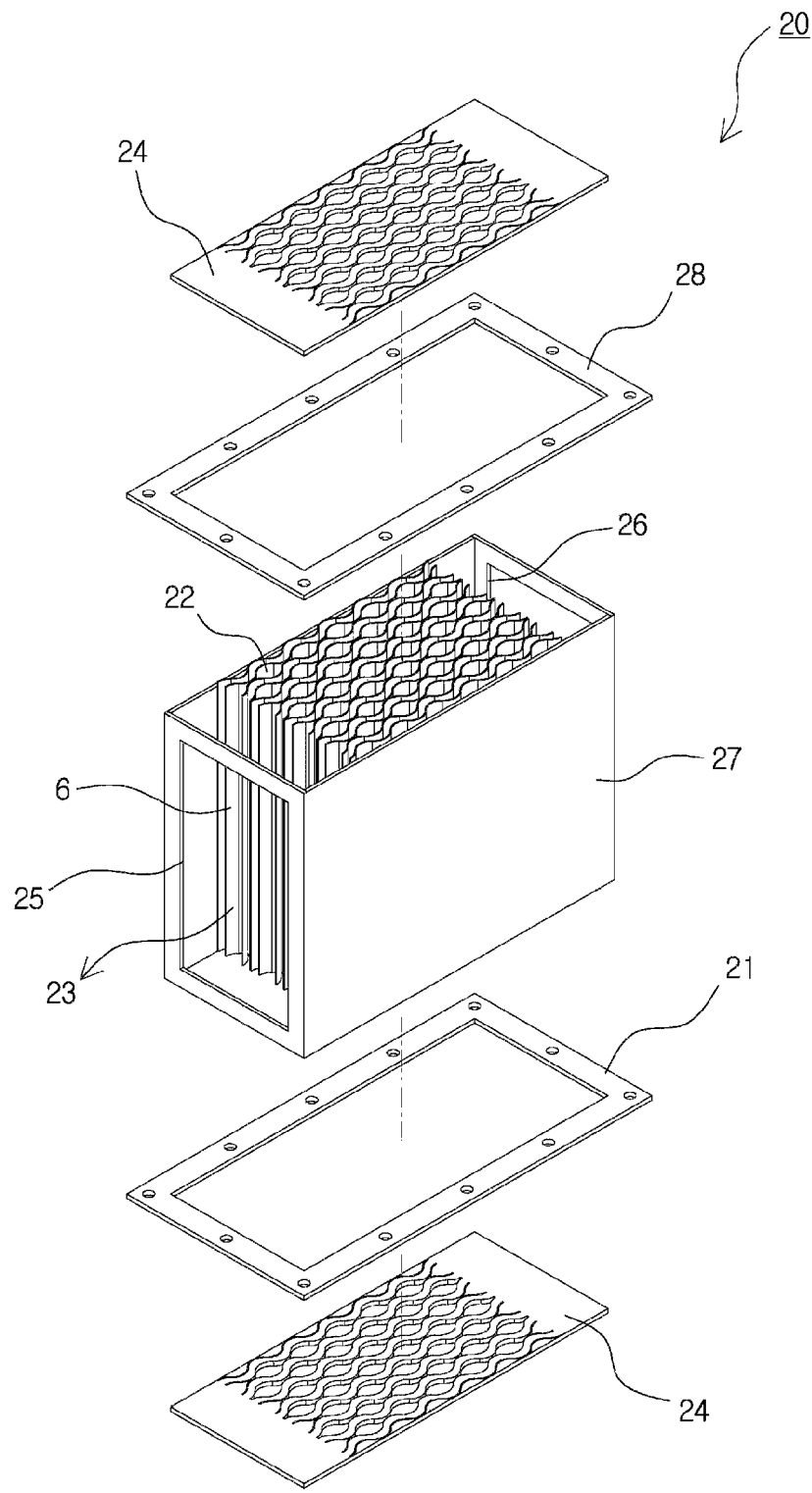
FIG. 8 is an exploded perspective view of the sensible heat exchanger.
Figure 9:
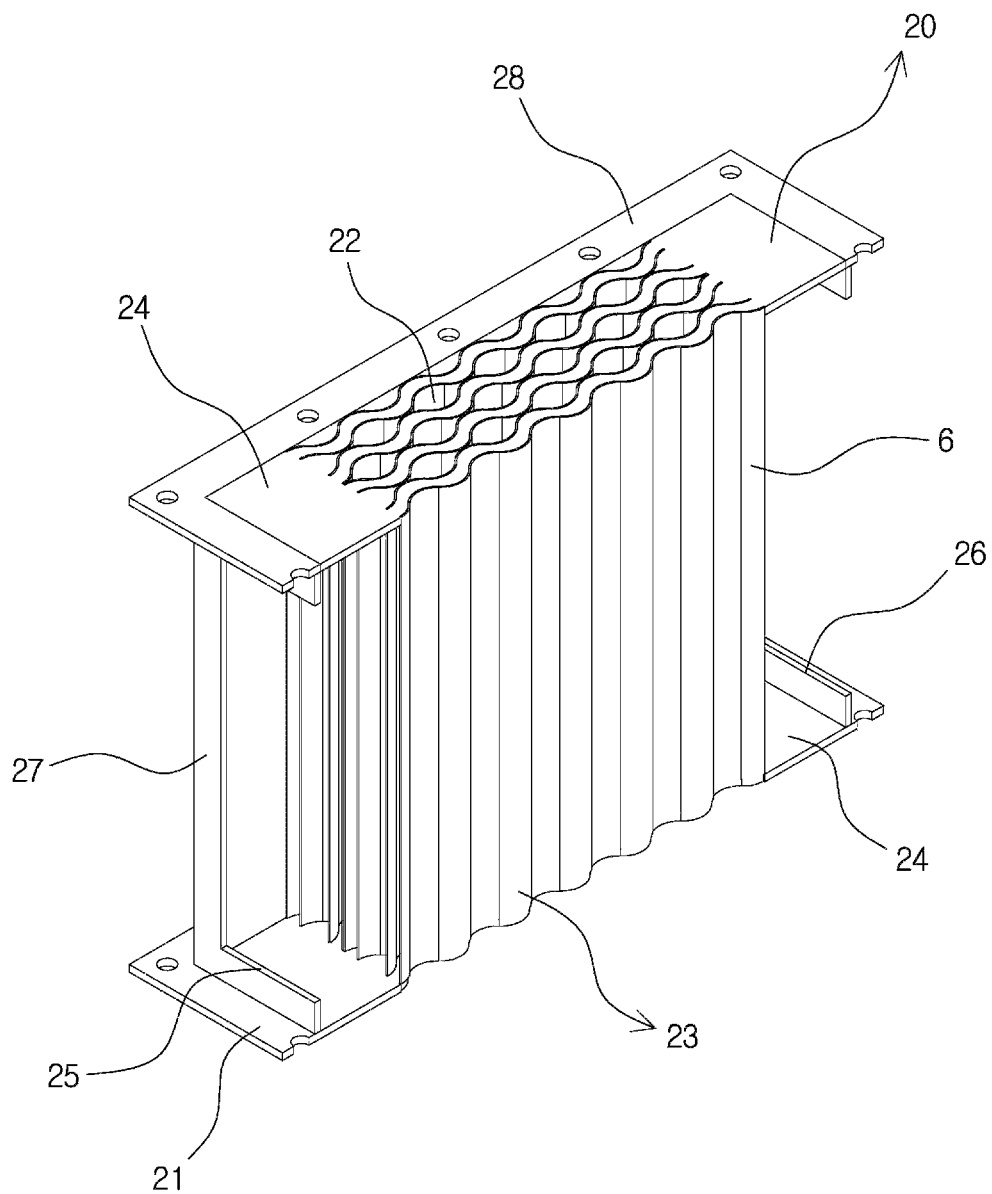
FIG. 9 is a perspective view showing a cross section of the sensible heat exchanger.
Figure 10:
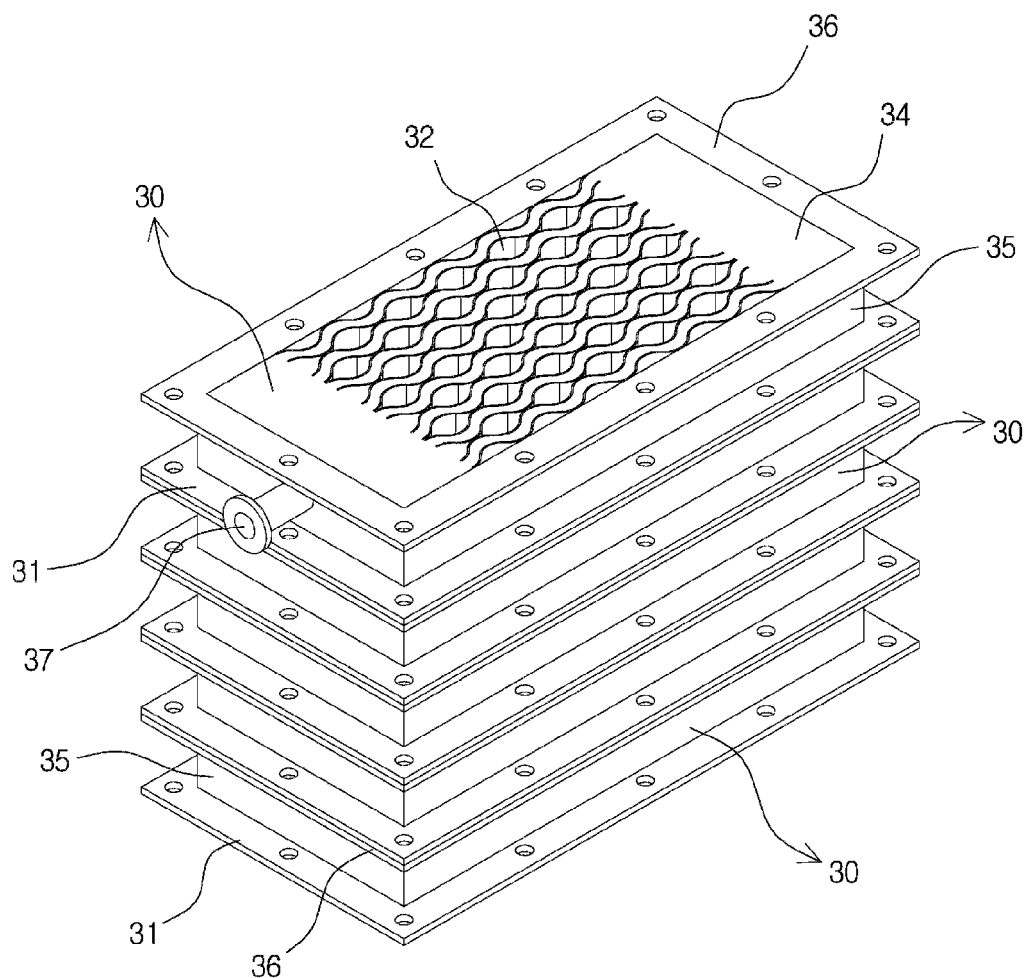
FIG. 10 is a perspective view showing a state where first latent heat exchangers are laminated in multi-stage.
Figure 11:
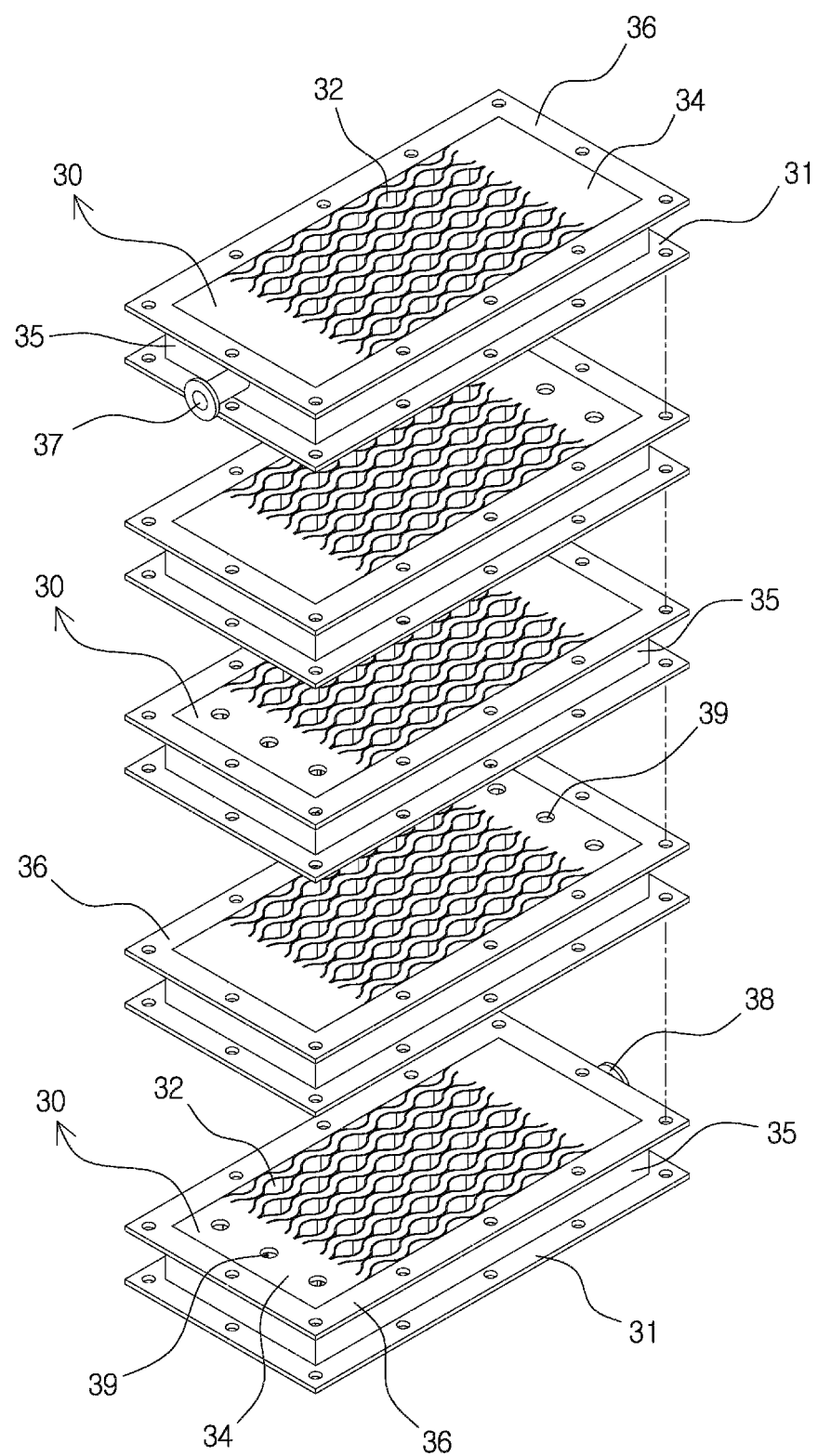
FIG. 11 is an exploded perspective view of the first latent heat exchangers.
Figure 12:
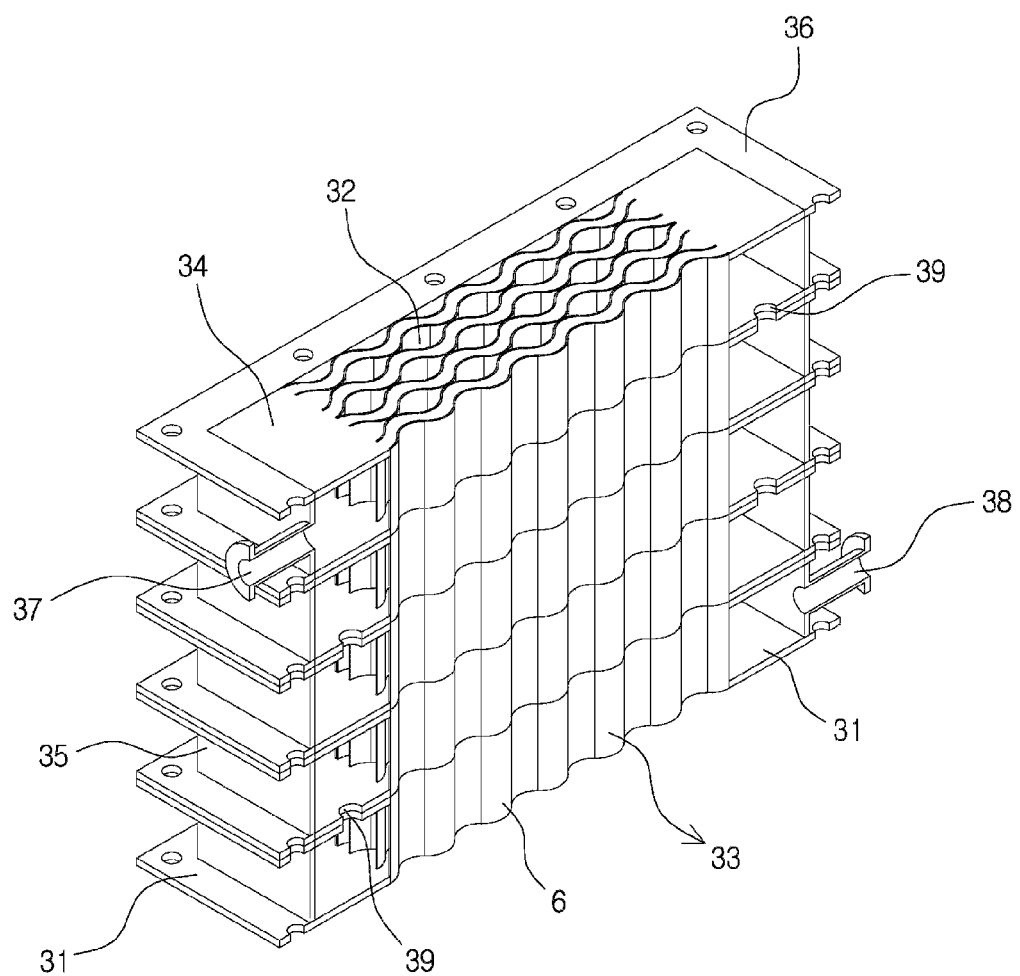
FIG. 12 is a sectionally perspective view showing the state where the first latent heat exchangers are laminated in multi-stage.
Figure 13:
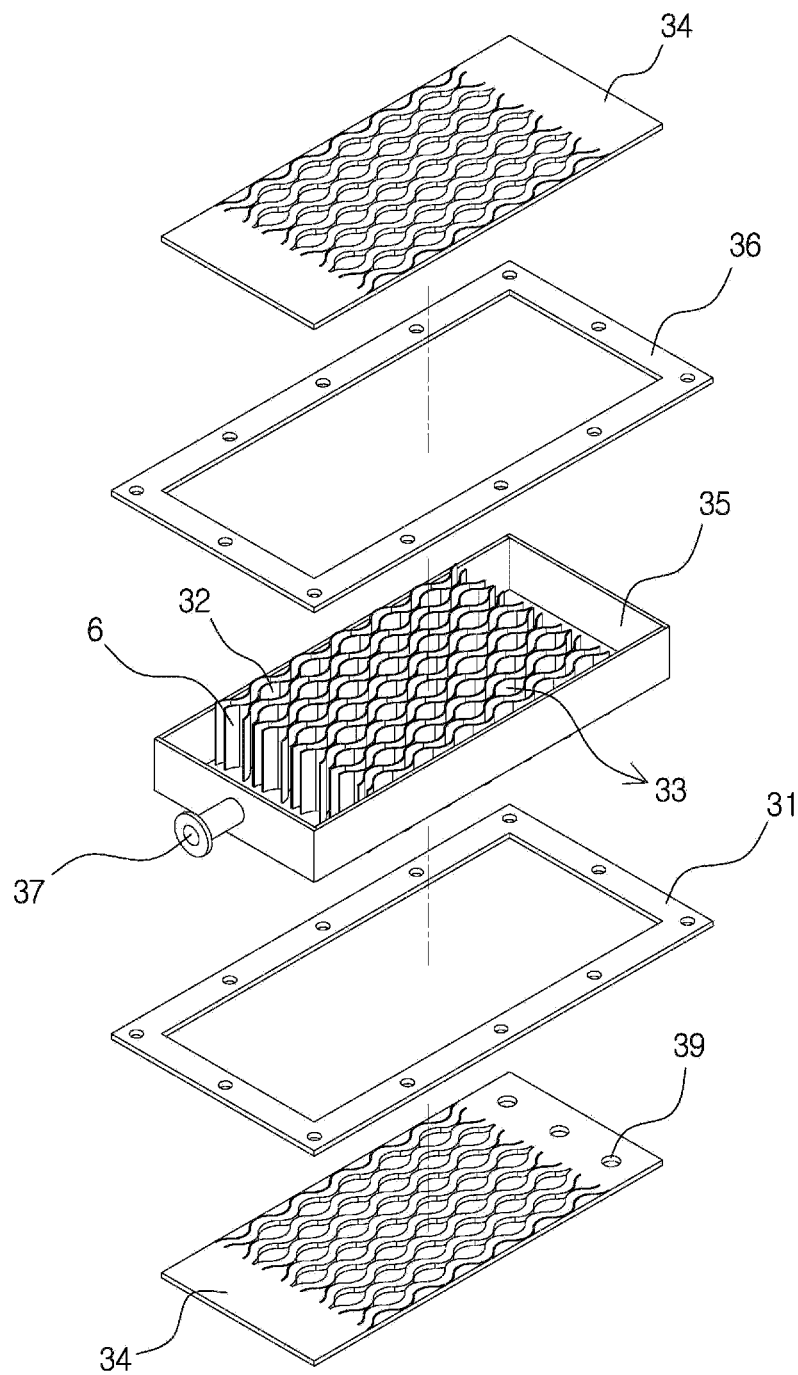
FIG. 13 is an exploded perspective view of the first latent heat exchangers.
Figure 14:
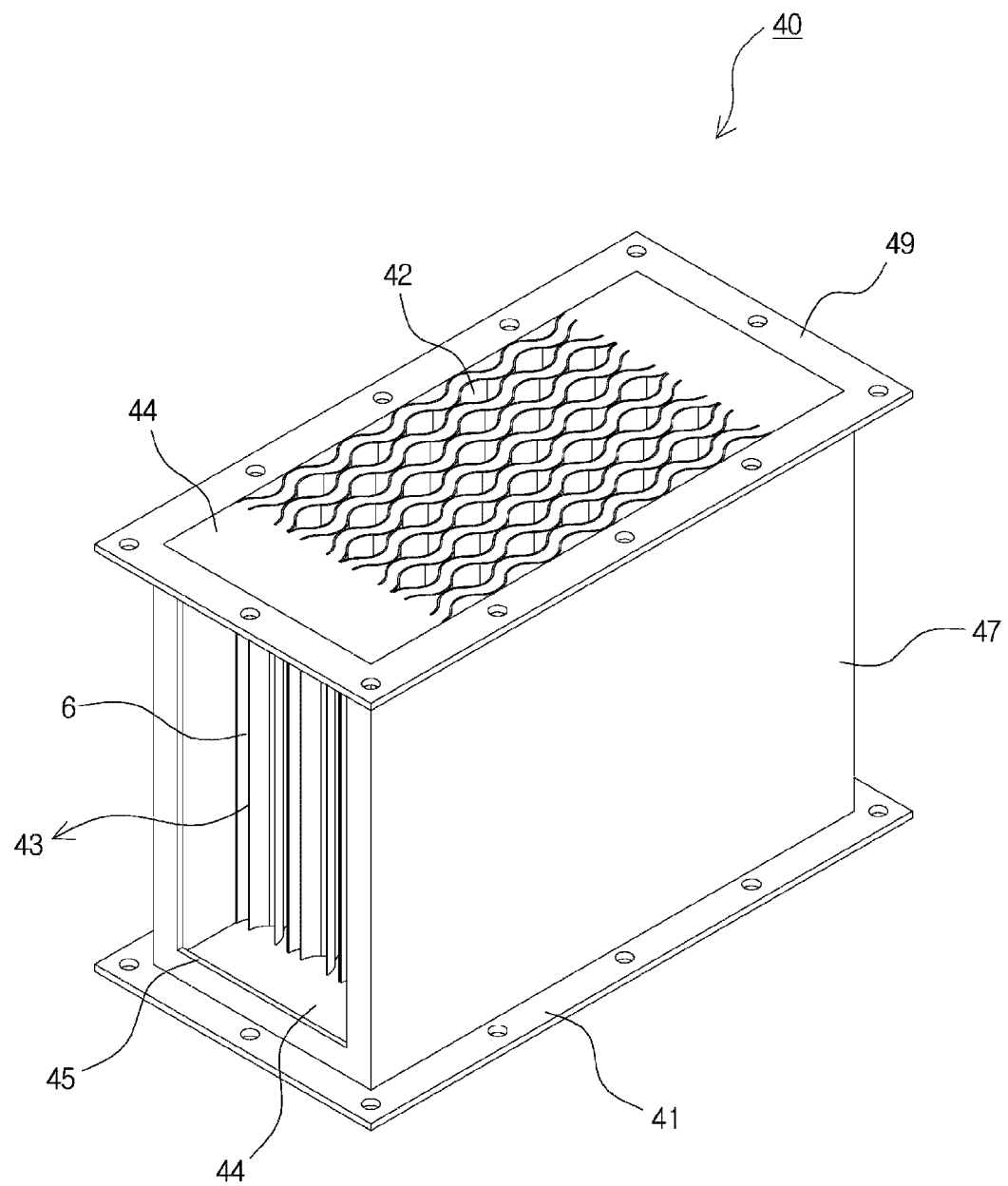
FIG. 14 is a perspective view of a second sensible heat exchanger according to the present invention.
Figure 15:
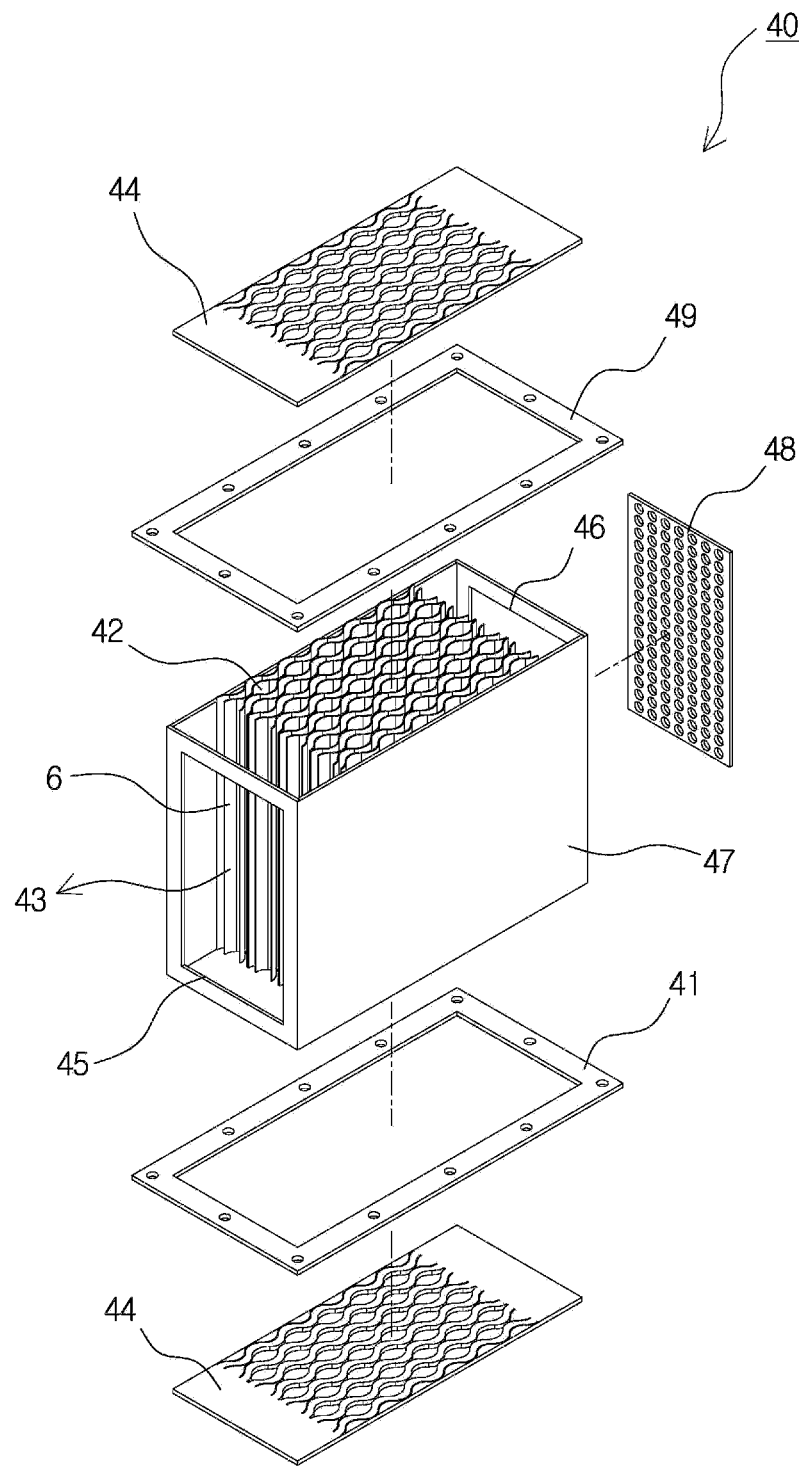
FIG. 15 is an exploded perspective view of the second sensible heat exchanger.
Figure 16:
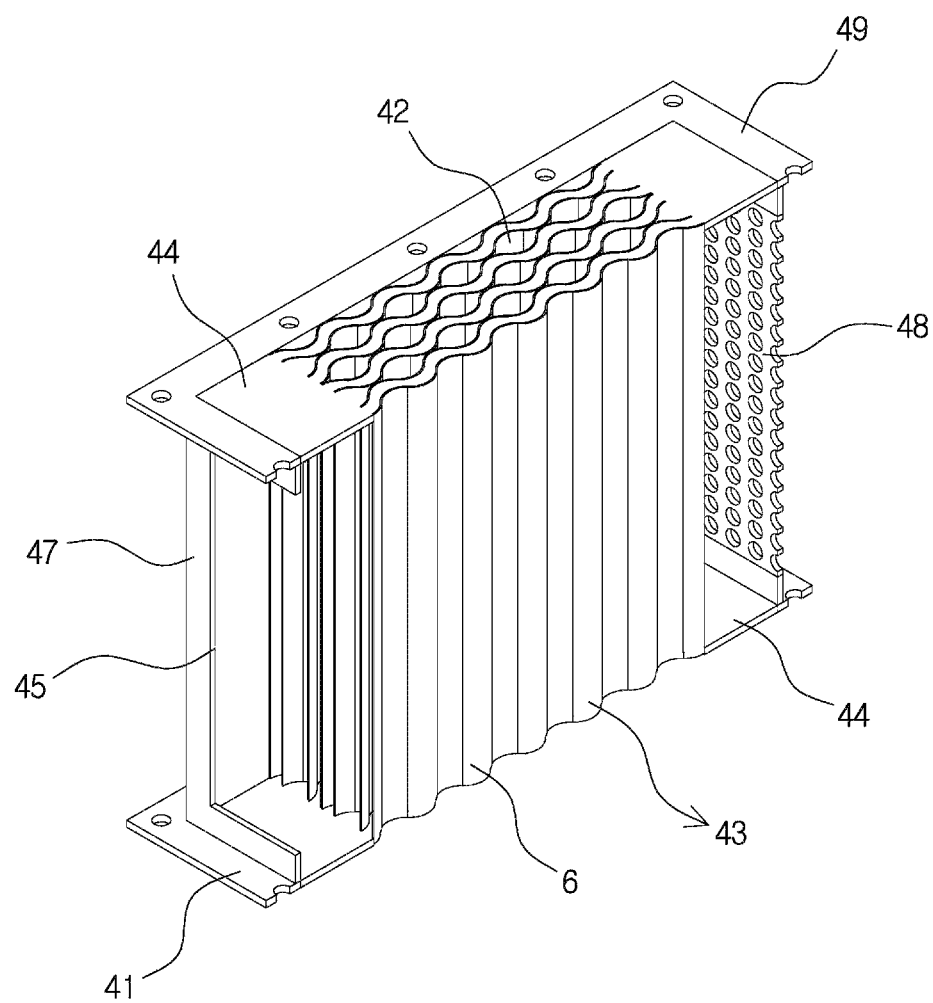
FIG. 16 is a sectionally perspective view of the second sensible heat exchanger in cross section.
Figure 17:
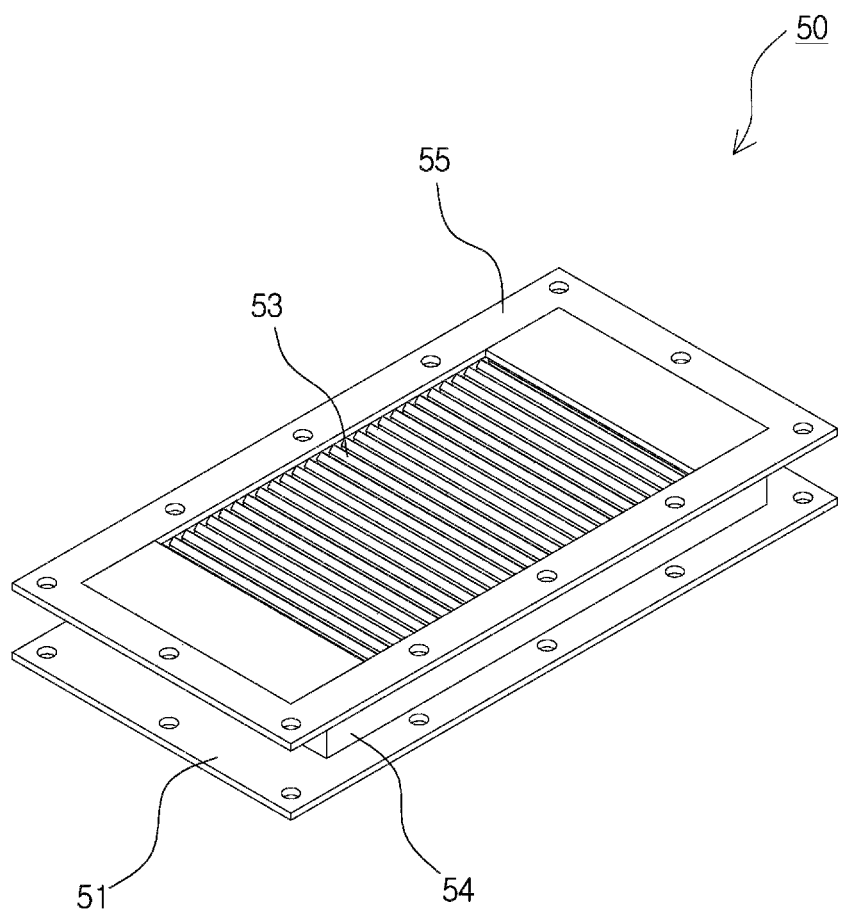
FIG. 17 is a perspective view of a steam separator according to the present invention.
Figure 18:
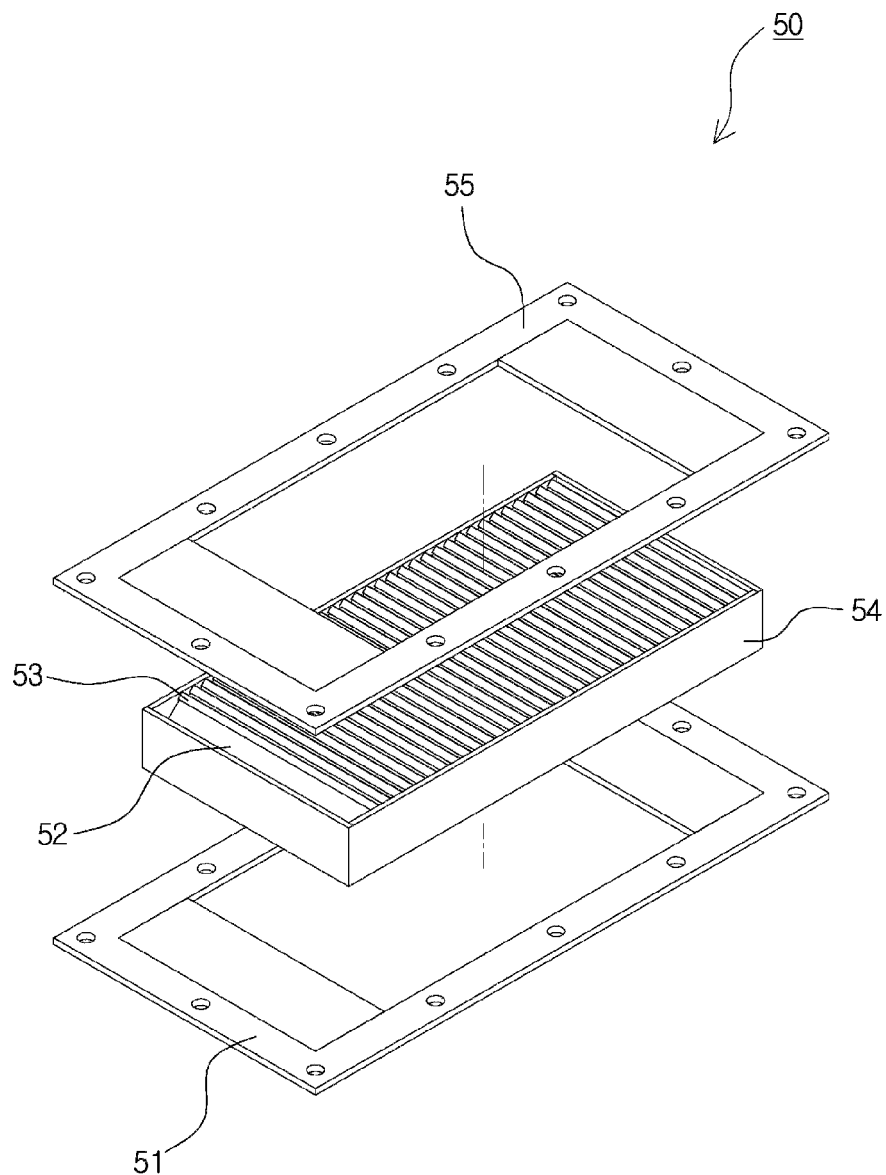
FIG. 18 is an exploded perspective view of the steam separator.
Figure 19:
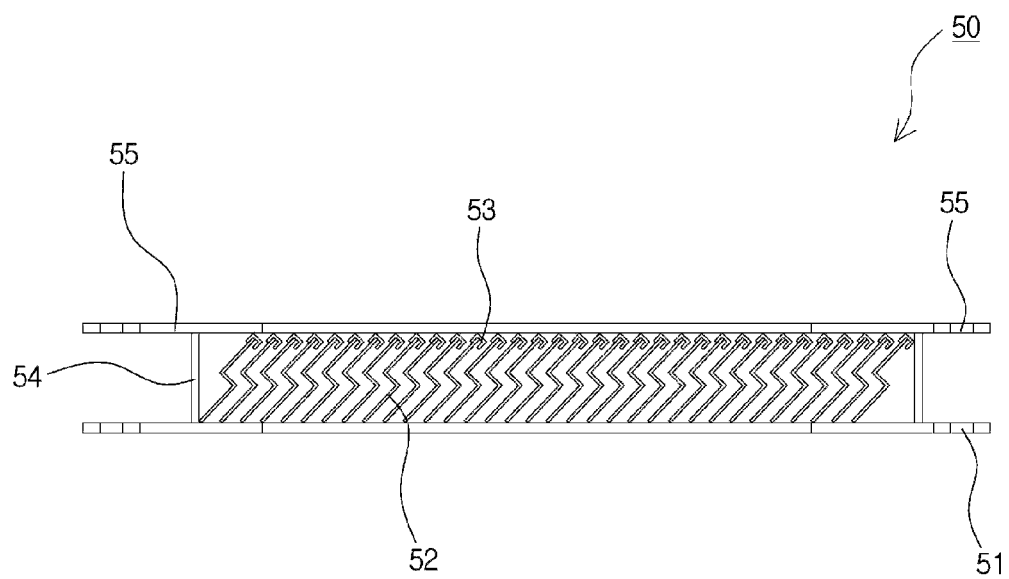
FIG. 19 is a front sectional view of the steam separator, in cross section.
Figure 20:
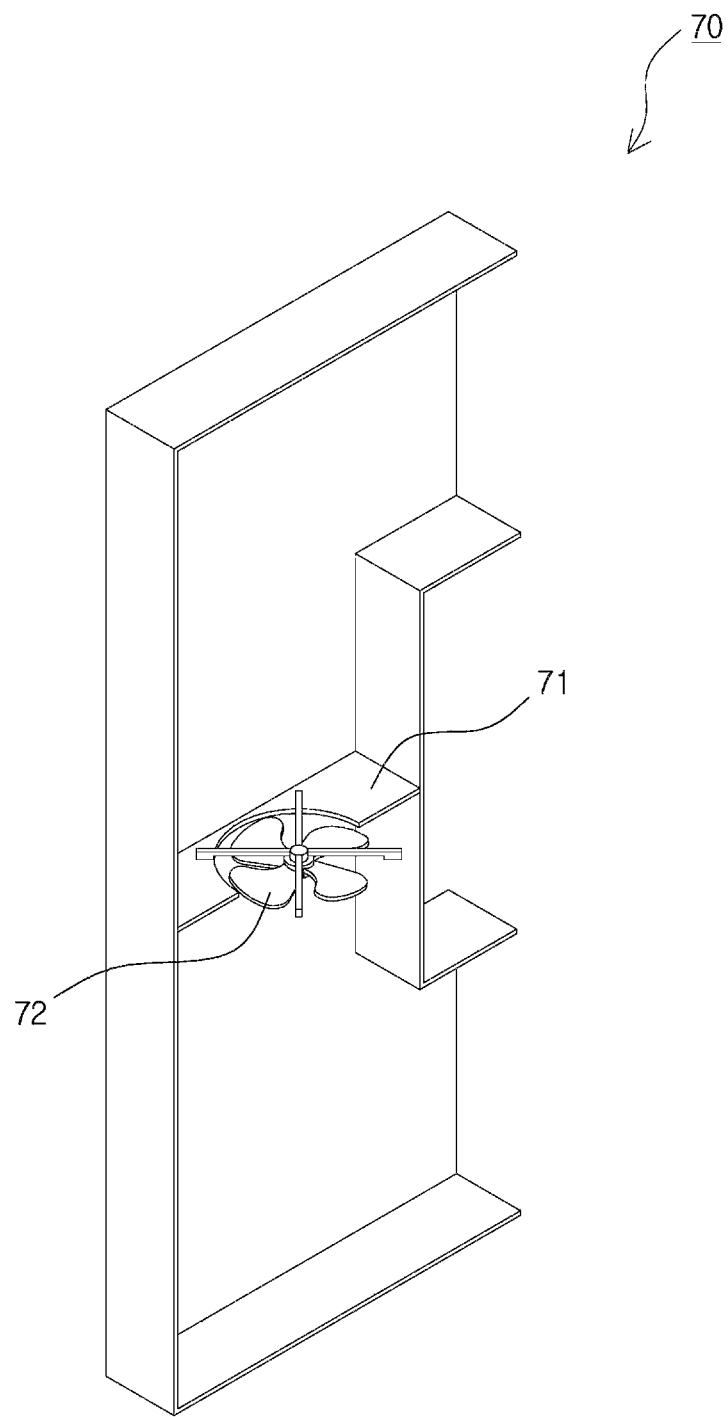
FIG. 20 is a partially perspective view, in cross section, of the inside of a circulation duct.
Figure 21:
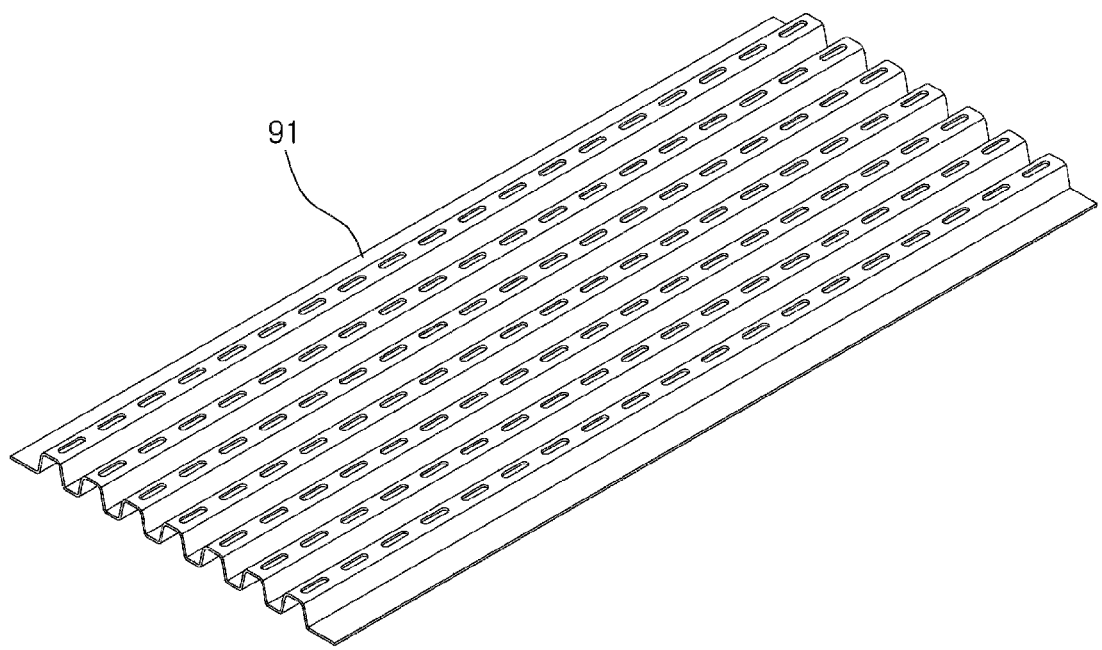
FIG. 21 is a perspective view of a dispersion plate according to another preferred embodiment of the present invention.

Reference will be now made in detail to the preferred embodiment of the present invention with reference to the attached drawings.

Referring to FIGS. 1 to 24, a white smoke reducing system according to the present invention includes: a discharge gas inflow pipe 4 for supplying exhaust gas of high temperature and humidity containing vapor; a water recovery part 10 connected with the discharge gas inflow pipe 4 for receiving discharge gas; a sensible heat exchanger 20 disposed on the water recovery part 10; a first latent heat exchanger 30 disposed on the sensible heat exchanger 20; a second sensible heat exchanger 40 disposed on the first latent heat exchanger 30; a steam separator 50 disposed on the second sensible heat exchanger 40; a discharge part 60 disposed on the steam separator 50; a circulation duct 70 connected with an air inlet 25 of the sensible heat exchanger 20 and an outside air outlet 45 of the second sensible heat exchanger 40; and a mixing duct 80 connected to an air outlet 26 of the sensible heat exchanger 20 and an inflow hole 63 of the discharge part 60.

As described above, the discharge gas inflow pipe 4 is disposed to supply the exhaust gas of high temperature and humidity containing vapor.

In this instance, the exhaust gas of high temperature and humidity supplied to the discharge gas inflow pipe 4 is exhaust gas of about 70° C. to 80° C. discharged from industrial facilities, such as boilers, incinerators, driers, and others, but any exhaust gas discharged at temperature higher than room temperature may be applied.

The water recovery part 10 includes: a discharge gas inlet 11 connected with the discharge gas inflow pipe 4 and formed at one side thereof to receive discharge gas; and an upper plate 13 of a flat type disposed at an upper portion thereof and having a water recovery hole 12 perforated therein.

Moreover, the water recovery part 10 further includes: a water recovery pipe 15 disposed at one side of the bottom thereof for discharging water flowing from the upper part; and a lower dispersion plate 14 of a flat type disposed in the water recovery hole 12 and having a plurality of through holes for dispersively supplying exhaust gas.

In this instance, when the exhaust gas of high temperature and humidity supplied through the discharge gas inflow pipe 4 moves upwardly through the through holes of the lower dispersion plate 14 and passes through the sensible heat exchanger 20, the first latent heat exchanger 30 and the second sensible heat exchanger 40 which will be described later, water is generated through heat exchange and condensation of the exhaust gas in the steam separator 50, and the water drops down and is collected into the water recovery part 10. The water collected into the water recovery part 10 is discharged out through the water recovery pipe 15 or stored to be reused.

In the meantime, the lower dispersion plate 14 is disposed to evenly distribute and raise the discharge gas supplied through the discharge gas inflow pipe 4. The lower dispersion plate 14 is formed in a ribbed flat plate type like a dispersion plate 91 shown in FIG. 21. The lower dispersion plate has a plurality of the through holes formed on the upper portion of the ribbed plate so as to evenly distribute and raise the discharge gas. The water flowed from the upper portion is collected under the ribbed flat plate and is discharged out through the opened both sides so as to be collected into the water recovery part 10 formed below the lower dispersion plate 14.

Figure 22:
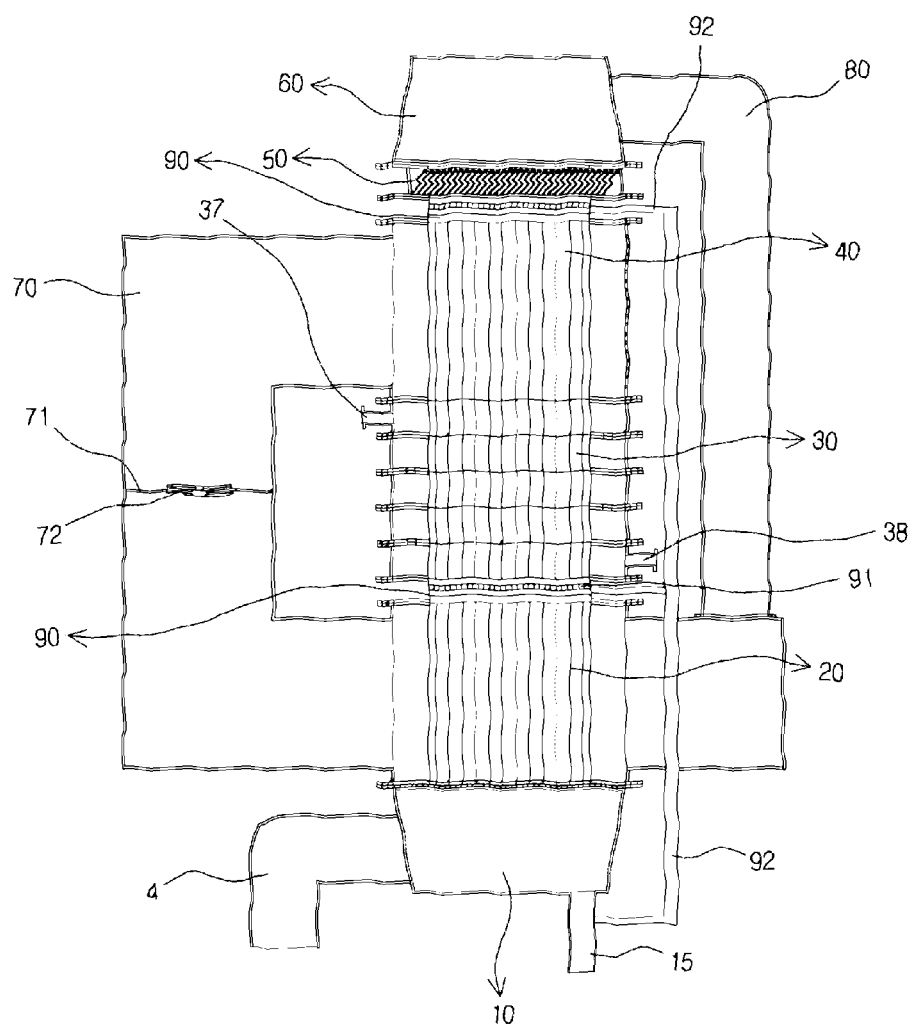
FIG. 22 is a sectional view of a water discharge part according to another preferred embodiment of the present invention.
Figure 23:
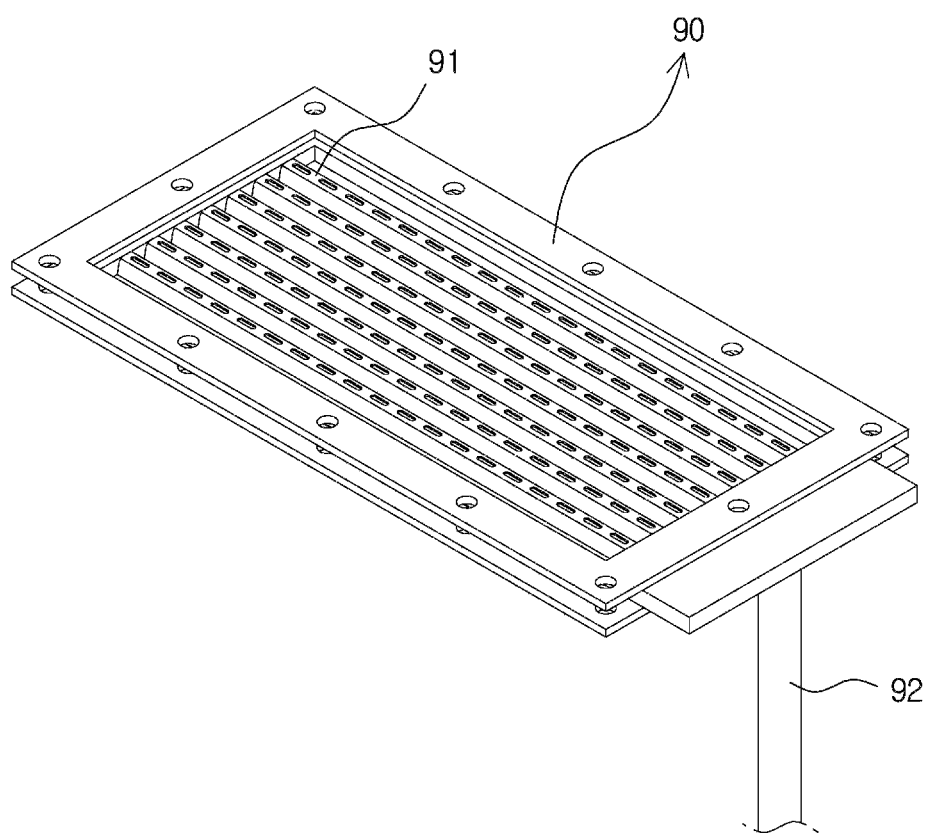
FIG. 23 is a perspective view of the water discharge part.
Figure 24:
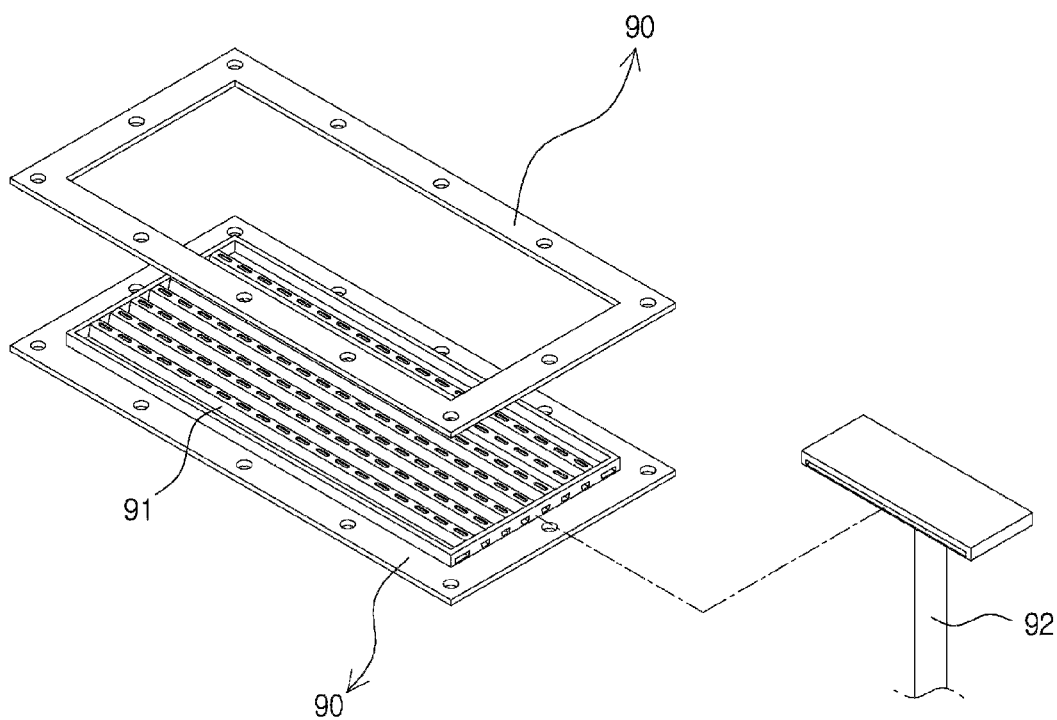
FIG. 24 is an exploded perspective view of the water discharge part.
Figure 25:
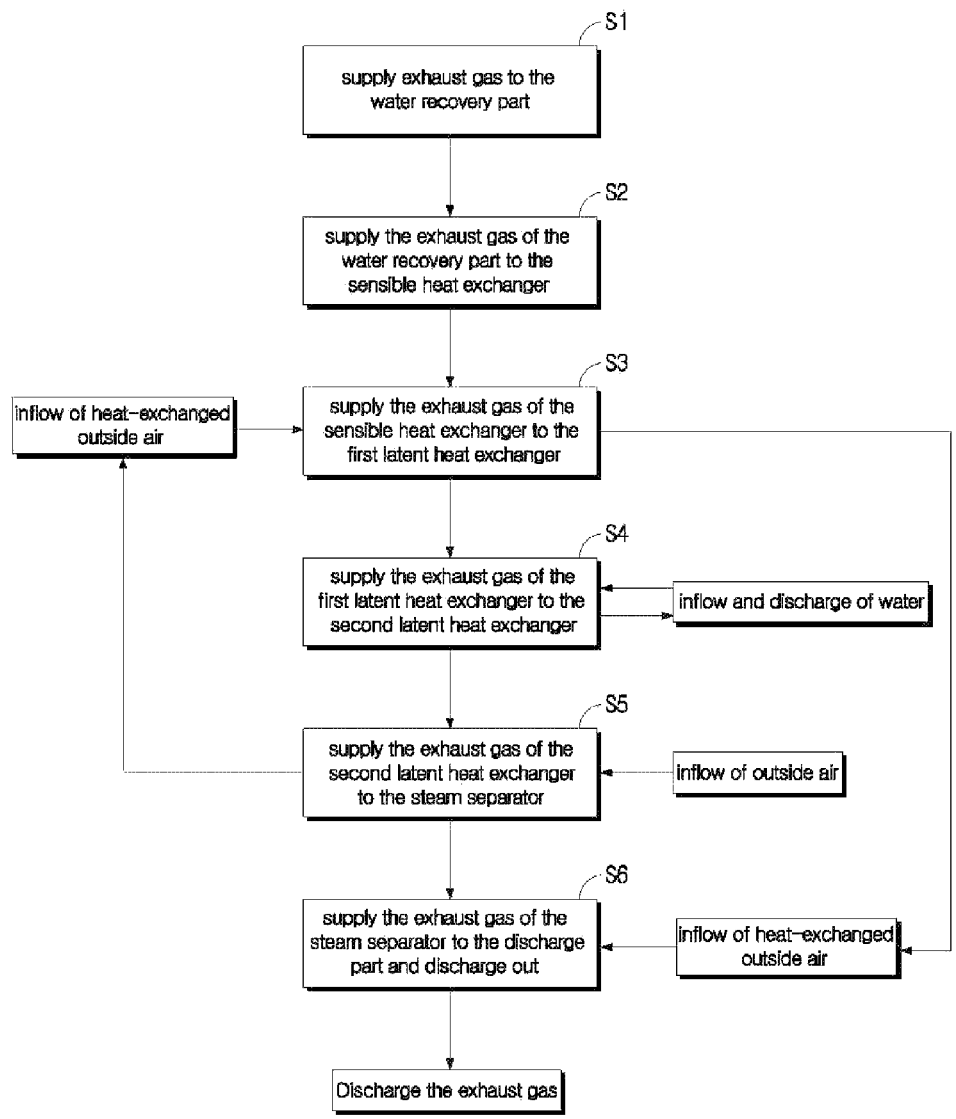
FIG. 25 is a flow chart showing a method of recovering waste heat and water using the white smoke reducing system according to the present invention.

Additionally, as shown in FIGS. 22 to 24, the dispersion plates 91 may be respectively seated inside the water discharge parts 90 which are respectively disposed below the first latent heat exchanger 30 and the steam separator 50. The water discharge part 90 is a rectangular tubular body having an opened inside and includes: a plurality of the through holes formed at one side thereof corresponding to the lower portion of the ribbed dispersion plate 91 so as to discharge the water collected below the ribbed dispersion plate 91; and a water discharge tube 92 disposed outside the through hole, the water discharge tube 92 having one side connected to the through holes so that the water discharged through the through holes is collected and flowed into the water discharge tube 92 and the other side connected with the water recovery pipe 15 so that the water flowed into the water discharge tube 92 is discharged out to the water recovery pipe 15.

In this instance, the water discharge part 90 is adapted to evenly distribute and raise the supplied exhaust gas by the dispersion plates 91. The water generated when the exhaust gas is condensed by heat exchange in the first latent heat exchanger 30, the second sensible heat exchanger 40 and the steam separator 50 is directly discharged to the water recovery pipe 15 connected with the water discharge tube 92, so that the water discharge part 90 serves to prevent a back flow of water to the discharge gas inflow pipe 4, which may occur due to an excessive amount of water generated by heat exchange of exhaust gas, because the water discharge part 90 directly discharges the water to the water recovery pipe 15 connected with the water discharge tube 92. So, it is preferable that the water discharge parts 90 are respectively mounted below the first latent heat exchanger 30 and the steam separator 50, but the number of the water discharge parts 90 may be varied according to capacity of the water recovery part 10.

The sensible heat exchanger 20 is disposed on the water recovery part 10, and includes: a lower plate 21 of a flat type joined to the upper plate 13 of the water recovery part 10 and having an inner space corresponding to the upper plate 13; a corrugated heat exchanging unit 23 disposed on the lower plate 21 and having a plurality of corrugated sheets 6 mounted at right angles to the lower plate 21, the corrugated sheets 6 being 1 mm to 4 mm in thickness and being arranged in such manner that corrugations are symmetric with corrugations of other corrugated sheets 6 so that exhaust conduits 22 for moving the exhaust gas are formed between the corrugated sheets 6; heat exchanging unit covers 24 of a flat type respectively disposed at upper and lower portion of the corrugated heat exchanging unit 23 and having through holes formed corresponding to the exhaust conduits 22 for moving the exhaust gas; side plates 27 disposed at both sides of the outer periphery of the corrugated heat exchanging unit 23 and respectively having the air inlet 25 and the air outlet 26; and an upper plate 28 mounted on upper portions of the side plates 27 and having an inner space corresponding to the lower plate 21.

In this instance, the corrugated sheets 6 prevent generation of a turbulent flow when air passes between the corrugated sheets 6 and enhance efficiency of heat transfer by extending a period of time that air stays. Compared with heat exchangers that a plurality of pipes are connected with one another by circumferential joint, the corrugated heat exchanging unit 23 having the plural corrugated sheets 6 receives resistance less than the prior arts when air and exhaust gas move because it has smaller empty spaces at the upper and lower portions, and hence, there is no need to additionally increase capacity of fan mounted at the existing chimney.

In the meantime, the exhaust gas of 70° C. to 80° C. supplied to the water recovery part 10 is evenly dispersed through the dispersion plate 14 of the water recovery hole 12 perforated in the upper plate 13 of the water recovery part 10 and is supplied to the exhaust conduit 22 of the corrugated heat exchanging unit 23 formed inside the sensible heat exchanger 20 located on the water recovery hole 12. Temperature of the exhaust gas supplied to the exhaust conduit 22 drops to 60° C. to 70° C. by heat-exchanging with the outside air of 15° C. to 25° C. supplied to the outside of the exhaust conduit 22 through the circulation duct 70 and the air inlet 25 of the sensible heat exchanger 20. The outside air passing outside the exhaust conduit 22 rises to 35° C. to 45° C. by heat-exchanging with the exhaust gas of the exhaust conduit 22, and then, is discharged out through the air outlet 26 of the sensible heat exchanger 20.

The first latent heat exchanger 30 is disposed on the sensible heat exchanger 20, and includes: a first lower plate 31 having an inner space corresponding to the upper plate 28 of the sensible heat exchanger 20; a first corrugated heat exchanging unit 33 disposed on the first lower plate 31 and having a plurality of corrugated sheets 6 mounted at right angles to the first lower plate 31, the corrugated sheets 6 being arranged in such manner that corrugations are symmetric with corrugations of other corrugated sheets 6 so that first exhaust conduits 32 for moving the exhaust gas are formed between the corrugated sheets 6; first heat exchanging unit covers 34 of a flat type respectively disposed at upper and lower portion of the first corrugated heat exchanging unit 33 and having through holes formed corresponding to the first exhaust conduits 32 for moving the exhaust gas; first side plates 35 disposed at the outer periphery of the first corrugated heat exchanging unit 33 and being at right angles to the first lower plate 31; a first upper plate 36 mounted on upper portions of the first side plates 35 and having an inner space corresponding to the first lower plates 31, wherein the first lower plate 31, the first corrugated heat exchanging units 33, the first heat exchanging unit covers 34, the first side plates 35 and the first upper plates 36 are laminated in multi stage; a water discharge hole 38 disposed at one side of a lower portion for discharging water; and water circulation holes 39 symmetrically formed in the upper portion of one side and in the lower portion of the other side in a zigzag form so that water passes from the top to the bottom inside the first latent heat exchanger 30 whose components are laminated in multi stage.

In this instance, the exhaust gas with temperature of 60° C. to 70° C. while passing through the first exhaust conduit 22 of the sensible heat exchanger 20 is supplied to the first exhaust conduits 32 of the first corrugated heat exchanging unit 33 of the first latent heat exchanger 30 mounted on the exhaust conduit 22. Water is supplied through the water inlet 37 formed at one side of the upper portion of the first latent heat exchanger 30, and the supplied water passes from the top to the bottom along the water circulation holes 39 symmetrically formed at the upper portion of one side and the lower portion of the other side in the zigzag form inside the first latent heat exchanger 30. Temperature of the exhaust gas supplied to the exhaust conduit 32 drops to 40° C. to 50° C. by heat-exchanging with water which is supplied to the outside of the exhaust conduit 32 and is discharged to the water outlet 38.

Moreover, the exhaust gas starts to be first condensed while temperature of the exhaust gas drops from the range of 60° C. to 70° C. to the range of 40° C. to 50° C. in the first latent heat exchanger 30, and water generated due to condensation of the exhaust gas flows downward along the exhaust conduit 32 of the corrugated heat exchanging unit 33.

In this instance, dew point temperature of the exhaust gas condensed in the first latent heat exchanger 30 is about 55° C. to 65° C., and condensation is continued till temperature of the exhaust gas reaches 40° C. to 50° C. while the exhaust gas passes through the first latent heat exchanger 30.

Furthermore, water generated by condensation of exhaust gas in the first latent heat exchanger 30 flows downward along the exhaust conduit 32 and activates condensation of exhaust gas which is not yet condensed, so that the present invention can recover still more water, remove unfiltered fine duct and bad smells, and clean the exhaust conduit 32.

The second sensible heat exchanger 40 is disposed on the first latent heat exchanger 30, and includes: a second lower plate 41 joined to the upper portion of the first upper plate 36 of the first latent heat exchanger 30 and having an inner space corresponding to the first upper plate 36 of the first latent heat exchanger 30; a second corrugated heat exchanging unit 43 disposed on the second lower plate 41 and having a plurality of corrugated sheets 6 mounted at right angles to the second lower plate 41, the corrugated sheets 6 being arranged in such manner that corrugations are symmetric with corrugations of other corrugated sheets 6 so that second exhaust conduits 42 for moving the exhaust gas are formed between the corrugated sheets 6; second heat exchanging unit covers 44 of a flat type respectively disposed at upper and lower portion of the second corrugated heat exchanging unit 43 and having through holes formed corresponding to the second exhaust conduits 42 for moving the exhaust gas; second side plates 47 respectively disposed at the outer periphery of the second corrugated heat exchanging unit 43 and having an outside air outlet 45 perforated in one side and an outside air inlet 46 perforated in the other side for introducing the outside air; an upper dispersion plate 48 of a flat type disposed at the outside air inlet 46 for allow entering of outside air through a plurality of through holes thereof; and a second upper plate 49 disposed on the second side plates 47 and having an inner space formed corresponding to the second lower plate 41.

In this instance, the exhaust gas reaching 40° C. to 50° C. while passing through the first exhaust conduit 32 of the first latent heat exchanger 30 is supplied to the second exhaust conduits 42 of the second corrugated heat exchanging unit 43 of the second sensible heat exchanger 40 disposed on the first exhaust conduit 32. Temperature of the exhaust gas supplied to the second exhaust conduit 42 drops to 30° C. to 40° C. because the exhaust gas heat-exchanges with the outside of 0° C. to 10° C. introduced to the outside of the second exhaust conduit 42 through the outside air inlet 46 of the second sensible heat exchanger 40. Temperature of the outside air heat-exchanged with the exhaust gas reaches 15° C. to 25° C., and the outside air is supplied to the circulation duct 70 through the outside air outlet 45 of the second sensible heat exchanger 40, and the exhaust gas passing through the second sensible heat exchanger 40 is in a saturated water vapor state of 30° C. to 40° C.

In the meantime, the circulation duct 70 is connected with the air inlet 25 of the sensible heat exchanger 20 and the outside air outlet 45 of the second sensible heat exchanger 40 so as to supply the outside air of the second sensible heat exchanger 40 to the sensible heat exchanger 20. The circulation duct 70 includes a blower fixing plate 71 of a flat type disposed inside the circulation duct 70 and having a through hole, and hence, a blower 72 may be mounted in the through hole of the blower fixing plate 71.

The steam separator 50 is disposed on the second sensible heat exchanger 40, and includes: a lower plate 51 joined to the upper portion of the second upper plate 49 and having an inner space formed corresponding to the second upper plate 49; a plurality of steam separating members 52 of a flat type respectively spaced apart from one another on the lower plate 51 and arranged in a zigzag form in the upward direction; blocking members 53 respectively disposed at the front ends of upper portions of the steam separating members 52 and respectively being bent downwardly; side plates 54 disposed on the outer circumferential surfaces of the steam separating members 52 and the blocking members 53; and an upper plate 55 disposed on the side plates 54 and having an inner space formed corresponding to the lower plate 51.

In this instance, the exhaust gas reaching 20° C. to 30° C. in the saturated water vapor state while passing through the second exhaust conduit 42 of the second sensible heat exchanger 40 is supplied to the blocking members 53 downwardly bent at the front ends of the upper portions of the plural steam separating members 52 of the flat type formed in the zigzag form in the upward direction inside the steam separator 50 disposed on the second exhaust conduit 42. The exhaust gas supplied to the steam separating units 52 and the blocking units 53 flows downward because moisture contained in the exhaust gas is condensed and separated, and condensation of the moisture is more activated while uncondensed exhaust gas flows downwardly, so that more exhaust gas can be condensed.

The discharge part 60 is disposed on the steam separator 50, and includes: a lower plate 61 joined to the upper portion of the upper plate 55 of the steam separator 50 and having an inner space formed corresponding to the upper plate 55 of the steam separator 50; side plates 62 disposed on the lower plate 61, the side plates 62 being assembled in such a manner that upper and lower portions are opened and the outer periphery is gradually narrowed in the upward direction; an inlet 63 formed in one side of the side plate 62; and a dispersion plate 64 of a flat type formed inside the inlet 63 and having a plurality of through holes formed therein.

The mixing duct 80 has one side connected to the inlet 63 of the discharge part 60 and the other side connected to the air outlet 26 of the sensible heat exchanger 20 so as to supply the outside air discharged through the air outlet 26 to the inlet 63.

In this instance, the plural through holes formed in the dispersion plate 64 of the discharge part 60 serve to evenly disperse and supply the outside air supplied through the air outlet 26 and the mixing duct 80 to the discharge part 60.

Meanwhile, the exhaust gas from which moisture is separated while the exhaust gas contain moisture passes through the steam separating members 52 and the blocking members 53 of the steam separator 50 is supplied to the discharge part 60 disposed on the steam separator 50, and the exhaust gas of 30° C. to 40° C. supplied to the discharge part 60 is mixed with the outside air of 35° C. to 45° C. supplied through the mixing duct 80, which is connected with the inlet 63 of the discharge part 60 and the air outlet 26 of the sensible heat exchanger 20, and then, is discharged to the outside.

In this instance, humidity of the exhaust gas discharged through the discharge part 60 drops below 50%, and hence, white smoke is not generated because the exhaust gas shows a low percentage of humidity.

As described above, the white smoke reducing system according to the present invention is simple in structure, but can reduce waste of energy because it can recover waste heat and reuse it as a heat source for heating without discharging the exhaust gas of high temperature and humidity, which is used in the industrial facilities, to the air as it is, and can reduce consumption of water used as cooling water by condensing and recovering a great quantity of moisture contained in the exhaust gas.

Moreover, in the winter season, the white smoke reducing system according to the present invention can prevent white smoke by condensing and recovering a great quantity of moisture contained in the exhaust gas, and remove fine dust and bad smells contained in the exhaust gas.

In the meantime, referring to FIGS. 1 to 25, a method of recovering waste heat and water using the white smoke reducing system according to the present invention will be described as follows.

The method of recovering waste heat and water using the white smoke reducing system includes: a first step (S1) of supplying the exhaust gas of high temperature and humidity of 70° C. to 80° C. generated from industrial facilities to the water recovery part 10 through the discharge gas inflow pipe 4; a second step (S2) of supplying the exhaust gas of 70° C. to 80° C. of the water recovery part 10 to the exhaust conduit 22 of the corrugated heat exchanging unit 23 of the sensible heat exchanger 20 through the water recovery hole 12 formed in the upper plate of the water recovery part 10, making temperature of the exhaust gas inside the exhaust conduit 22 reach 60° C. to 70° C. by heat-exchanging with the outside air of 15° C. to 25° C. supplied to the outside of the exhaust conduit 22 through the circulation duct 70 and the air inlet 25 of the sensible heat exchanger 20, and making the outside air passing outside the exhaust conduit 22 reach 35° C. to 45° C. by heat-exchanging with the exhaust gas inside the exhaust conduit 22 and discharging the outside air through the air outlet 26 of the sensible heat exchanger 20; a third step (S3) of supplying the exhaust gas, which reaches 60° C. to 70° C. while passing the exhaust conduit 22 of the sensible heat exchanger 20, to the first exhaust conduits 32 of the first corrugated heat exchanging unit 33 of the first latent heat exchanger 30 laminated in multi stage on the exhaust conduits 22, supplying water at one side of the upper portion laminated in multi stage inside the first latent heat exchanger 30 through the water inlet 37, passing the supplied water from the top to the bottom along the water circulation holes 39 symmetrically formed at an upper portion of one side and a lower portion of the other side in a zigzag form in all layers laminated inside the first latent heat exchanger 20 in multi stage, and making the exhaust gas of the first exhaust conduit 32 reach 40° C. to 50° C. by heat-exchanging with water, which is supplied to the outside of the first exhaust conduit 32 and discharged through the water discharge hole 38 disposed at one side of a lower portion of the first latent heat exchanger 30; a fourth step (S4) of supplying the exhaust gas, which reaches 40° C. to 50° C. while passing the first exhaust conduit 32 of the first latent heat exchanger 30, to the second exhaust conduits 42 of the second corrugated heat exchanging unit formed inside the second sensible heat exchanger 40 disposed on the first exhaust conduit 32, making the exhaust gas of the second exhaust conduit 42 reach 30° C. to 40° C. by heat-exchanging with the outside air of 0° C. to 10° C., which is introduced outside the second exhaust conduit 42 through the outside air inlet 46 formed at the other side of the second sensible heat exchanger 40, and supplying the outside air heat-exchanged with the exhaust gas, whose temperature rises to 15° C. to 25° C., to the circulation duct 70 through the outside air outlet 45 formed at one side of the second sensible heat exchanger 40; a fifth step (S5) of supplying the exhaust gas, which reaches 30° C. to 40° C. while passing through the second exhaust conduit 42 of the second sensible heat exchanger 40, to the blocking members 53 bent downwardly at the front ends of the upper portions of the plural steam separating members 52 of a flat type formed inside the steam separator 50 disposed on the second exhaust conduit 42 and arranged in the zigzag form in the upward direction, and separating moisture from the exhaust gas supplied to the steam separating members 52 and the blocking members 53 and discharging the exhaust gas; and a sixth step (S6) of supplying the exhaust gas from which moisture is separated to the discharge part 60 disposed on the steam separator 50, and mixing the exhaust gas of 30° C. to 40° C. supplied to the discharge part 60 with the outside air of 35° C. to 45° C. and discharging the mixed exhaust gas to the outside through the mixing duct 80 connected with the inlet 63 formed at one side of the discharge part 60 and the air outlet 26 of the sensible heat exchanger 20.

When the above steps (S1 to S6) are finished, as described above, the present invention can prevent generation of white smoke when the exhaust gas is discharged out through the chimney because the exhaust gas is discharged out after moisture contained in the exhaust gas is separated from the exhaust gas, reuse the moisture separated from the exhaust gas as recycled water after collecting the moisture, and reuse water of high temperature through heat-exchange as industrial water for heating so as to reduce waste of energy, and remove fine dust and bad smells contained in the exhaust gas.

The method of recovering waste heat and water uses the white smoke reducing system described above, and a detailed description of the recovering method will be omitted because it is the same as the above.

What is claimed is:

1. A white smoke reducing system, comprising:
   a discharge gas inflow pipe configured to supply an exhaust gas containing a vapor;
   a water recovery part including:
      a discharge gas inlet connected with the discharge gas inflow pipe supplied by the discharge gas inflow pipe, and disposed at one side of the water recovery part, for receiving the exhaust gas;
      a flat-shaped upper plate disposed at an upper portion of the water recovery part, and having a water recovery hole having a frame-shape; and
      a cylindrical water recovery pipe disposed at a lower portion of the water recovery part;
   a sensible heat exchanger disposed on the water recovery part and including:
      a flat-shaped lower plate coupled with the upper plate of the water recovery part, and having an inner space corresponding to the upper plate of the water recovery part;
      a corrugated heat exchanging unit disposed on the lower plate, and having a plurality of corrugated sheets mounted at right angles to the lower plate, wherein the corrugated sheets are arranged in such manner that corrugations of one corrugated sheet of the sensible heat exchanger and corrugations of another corrugated sheet of the sensible heat exchanger are symmetric with respect to a plane between the one corrugated sheet of the sensible heat exchanger and the another corrugated sheet of the sensible heat exchanger so that exhaust conduits for moving the exhaust gas are formed between the corrugated sheets;
      flat-shaped heat exchanging unit covers respectively disposed at upper and lower portions of the corrugated heat exchanging unit, and having through holes disposed corresponding to the exhaust conduits for moving the exhaust gas;
      side plates disposed at two sides of an outer periphery of the corrugated heat exchanging unit, and respectively having an air inlet and an air outlet; and
      an upper plate mounted on upper portions of the side plates, and having an inner space corresponding to the lower plate;
   a first latent heat exchanger disposed on the sensible heat exchanger, and made of stacked assemblies, wherein the stacked assemblies include:
      a first lowermost assembly including a water outlet pipe on one side and a single set of water circulation holes at the opposite side,
      middle assemblies each of which includes one set of water circulation holes at each end of each middle assembly;
      a first uppermost assembly including a water inlet pipe on one side and a single set of water circulation holes at the opposite side,
      wherein each of the stacked assemblies includes:
         a first lower plate having an inner space corresponding to the upper plate of the sensible heat exchanger;
         a first corrugated heat exchanging unit disposed on the first lower plate, and having a plurality of corrugated sheets mounted at right angles to the first lower plate, wherein the corrugated sheets of the first corrugated heat exchanging unit are arranged in such manner that corrugations of one corrugated sheet of the first corrugated heat exchanging unit and corrugations of another corrugated sheet of the first corrugated heat exchanging unit are symmetric with respect to a plane between the one corrugated sheet of the first corrugated heat exchanging unit and the another corrugated sheet of the first corrugated heat exchanging unit so that first exhaust conduits for moving the exhaust gas are formed between the corrugated sheets of the first corrugated heat exchanging unit;
         flat-shaped first heat exchanging unit covers respectively disposed at upper and lower portions of the first corrugated heat exchanging unit, and having through holes disposed corresponding to the first exhaust conduits for moving the exhaust gas;
         first side plates disposed at an outer periphery of the first corrugated heat exchanging unit, and being at right angles to the first lower plate;
         a first upper plate mounted on upper portions of the first side plates, and having an inner space corresponding to the first lower plate;
   a second sensible heat exchanger disposed on the first latent heat exchanger, and including:
      a second lower plate coupled with an upper portion of the first upper plate of the first latent heat exchanger, and having an inner space corresponding to the first upper plate of the first uppermost assembly of the first latent heat exchanger;

a second corrugated heat exchanging unit disposed on the second lower plate, and having a plurality of corrugated sheets mounted at right angles to the second lower plate, wherein the corrugated sheets of the second corrugated heat exchanging unit are arranged in such manner that corrugations of one corrugated sheet of the second corrugated heat exchanging unit and corrugations of another corrugated sheet of the second corrugated heat exchanging unit are symmetric with respect to a plane between the one corrugated sheet of the second corrugated heat exchanging unit and the another corrugated sheet of the second corrugated heat exchanging unit so that second exhaust conduits for moving the exhaust gas are formed between the corrugated sheets of the second corrugated heat exchanging unit;

flat-shaped second heat exchanging unit covers respectively disposed at upper and lower portions of the second corrugated heat exchanging unit, and having through holes disposed corresponding to the second exhaust conduits for moving the exhaust gas;

second side plates disposed at two sides of an outer periphery of the second corrugated heat exchanging unit, and having an outside air outlet perforated in one of the second side plates and an outside air inlet perforated in the other of the second side plates, for introducing an outside air;

a flat-shaped upper dispersion plate disposed at the outside air inlet, and including a plurality of through holes configured to allow entering of outside air; and a second upper plate disposed on the second side plates, and having an inner space disposed corresponding to the second lower plate;

a steam separator disposed on the second sensible heat exchanger, and including:

a lower plate coupled with an upper portion of the second upper plate of the second sensible heat exchanger, and having an inner space disposed corresponding to the second upper plate of the second sensible heat exchanger;

a plurality of flat-shaped steam separating members respectively spaced apart from one another on the lower plate of the steam separator;

blocking members respectively disposed at front ends of upper portions of the steam separating members, and respectively being bent downwardly;

side plates disposed on outer circumferential surfaces of the steam separating members and the blocking members; and an upper plate disposed on the side plates of the steam separator, and having an inner space disposed corresponding to the lower plate of the steam separator;

a discharge part disposed on the steam separator, and including:

a lower plate coupled with the upper portion of the upper plate of the steam separator, and having an inner space disposed corresponding to the upper plate of the steam separator;

side plates disposed on the lower plate of the discharge part, wherein the side plates of the discharge part are assembled in such a manner that upper and lower portions of the discharge part are opened, and that an outer periphery of the discharge part is gradually narrowed in an upward direction;

an inlet disposed in at least one of the side plates of the discharge part; and a flat-shaped dispersion plate disposed inside the inlet of the discharge part, and having a plurality of through holes disposed in the flat-shaped dispersion plate;

a circulation duct connected with the air inlet of the sensible heat exchanger and the outside air outlet of the second sensible heat exchanger for supplying the outside air of the second sensible heat exchanger to the sensible heat exchanger; and a mixing duct connected to the air outlet of the sensible heat exchanger and the inlet of the discharge part for supplying the outside air discharged through the air outlet of the sensible heat exchanger to the discharge part through the inlet of the discharge part.

2. The white smoke reducing system according to claim 1, wherein the corrugated heat exchanging unit, the first corrugated heat exchanging unit, and the second corrugated heat exchanging unit are respectively constructed of a plurality of corrugated sheets, which are respectively 1 mm to 4 mm in thickness.

3. The white smoke reducing system according to claim 1, wherein the circulation duct comprises:

a flat-shaped blower fixing plate having a through hole formed therein; and a blower disposed in the through hole of the blower fixing plate.

* * * * *